United States Patent
Yamaguchi et al.

(10) Patent No.: US 8,068,200 B2
(45) Date of Patent: Nov. 29, 2011

(54) VERTICAL ALIGNMENT LIQUID CRYSTAL DISPLAY DEVICE IN WHICH A PIXEL ELECTRODE HAS SLITS WHICH DIVIDE THE PIXEL ELECTRODE INTO ELECTRODE PORTIONS

(75) Inventors: Minoru Yamaguchi, Hamura (JP); Yasushi Nakajima, Hachioji (JP); Ryota Mizusako, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 892 days.

(21) Appl. No.: 11/311,675

(22) Filed: Dec. 19, 2005

(65) Prior Publication Data

US 2006/0139541 A1 Jun. 29, 2006

(30) Foreign Application Priority Data

Dec. 24, 2004 (JP) ................................ 2004-375018
Dec. 27, 2004 (JP) ................................ 2004-377374

(51) Int. Cl.
*G02F 1/1337* (2006.01)
*G02F 1/1343* (2006.01)

(52) U.S. Cl. ....................... 349/130; 349/143

(58) Field of Classification Search .................. None
See application file for complete search history.

(56) References Cited

U.S. PATENT DOCUMENTS

| | | | |
|---|---|---|---|
| 4,402,999 A | | 9/1983 | Tatsumichi et al. |
| 5,309,264 A | * | 5/1994 | Lien et al. ............... 349/143 |
| 5,434,690 A | | 7/1995 | Hisatake et al. |
| 5,694,185 A | | 12/1997 | Oh |
| 5,724,107 A | | 3/1998 | Nishikawa et al. |
| 5,811,835 A | | 9/1998 | Seiki et al. |
| 6,115,093 A | | 9/2000 | Murai et al. |
| 6,256,082 B1 | | 7/2001 | Suzuki et al. |

(Continued)

FOREIGN PATENT DOCUMENTS

CN 1290920 A 4/2001

(Continued)

OTHER PUBLICATIONS

Related U.S. Appl. No. 11/311,679, filed Dec. 19, 2005, Inventor: M. Yamaguchi.

(Continued)

*Primary Examiner* — Mark Robinson
*Assistant Examiner* — Mary A El Shammaa
(74) *Attorney, Agent, or Firm* — Holtz, Holtz, Goodman & Chick, PC

(57) ABSTRACT

A liquid crystal display device has an opposing substrate on which an opposing electrode is formed, a TFT substrate on which pixel electrodes arranged in matrix, thin film transistors connected to the pixel electrodes respectively, and gate lines and data lines for the thin film transistors are formed, vertical alignment films formed on the opposing inner surfaces of these substrates, and a liquid crystal layer disposed between the vertical alignment films and having negative dielectric anisotropy. Each pixel electrode has a slit formed for separating each pixel into a plurality of sub-pixels by partially eliminating the pixel electrode with a connecting portion left at which adjoining electrode portions of each pixel electrode is connected with each other. The width $W_1$ of the pixel electrode that runs in a direction in which the slit is formed and width $W_2$ of the connecting portion have a ratio $W_2/W_1$ of 0.13 or lower.

19 Claims, 11 Drawing Sheets

U.S. PATENT DOCUMENTS

| | | |
|---|---|---|
| 6,285,429 B1 | 9/2001 | Nishida et al. |
| 6,335,776 B1 | 1/2002 | Kim et al. |
| 6,356,335 B1 | 3/2002 | Kim et al. |
| 6,384,889 B1 * | 5/2002 | Miyachi et al. ............ 349/143 |
| 6,449,025 B2 | 9/2002 | Lee |
| 6,462,798 B1 * | 10/2002 | Kim et al. ............ 349/129 |
| 6,473,142 B2 | 10/2002 | Kim et al. |
| 6,507,375 B1 | 1/2003 | Kawahata |
| 6,522,379 B1 | 2/2003 | Ishihara et al. |
| 6,567,144 B1 | 5/2003 | Kim et al. |
| 6,614,491 B2 | 9/2003 | Hasegawa et al. |
| 6,614,492 B1 * | 9/2003 | Song ............ 349/38 |
| 6,628,348 B1 | 9/2003 | Sakai et al. |
| 6,633,357 B2 | 10/2003 | Ko et al. |
| 6,654,090 B1 | 11/2003 | Kim et al. |
| 6,661,488 B1 | 12/2003 | Takeda et al. |
| 6,671,020 B2 | 12/2003 | Kim et al. |
| 6,680,769 B1 | 1/2004 | Lee et al. |
| 6,710,825 B2 * | 3/2004 | Kubo et al. ............ 349/48 |
| 6,710,837 B1 | 3/2004 | Song et al. |
| 6,724,452 B1 | 4/2004 | Takeda et al. |
| 6,727,969 B2 | 4/2004 | Chang et al. |
| 6,738,120 B1 * | 5/2004 | Song et al. ............ 349/139 |
| 6,747,722 B2 | 6/2004 | Ono et al. |
| 6,750,933 B1 | 6/2004 | Yakovenko et al. |
| 6,750,935 B2 | 6/2004 | Seo et al. |
| 6,757,040 B1 | 6/2004 | Kim et al. |
| 6,760,089 B1 | 7/2004 | Kuroha |
| 6,774,967 B2 | 8/2004 | Kim et al. |
| 6,853,427 B2 | 2/2005 | Park et al. |
| 6,879,364 B1 | 4/2005 | Sasaki et al. |
| 6,888,602 B2 | 5/2005 | Takeda et al. |
| 6,900,863 B2 | 5/2005 | Okamoto et al. |
| 6,940,574 B2 | 9/2005 | Lee et al. |
| 6,950,158 B2 | 9/2005 | Chang |
| 6,954,250 B2 | 10/2005 | Kuroha |
| 7,009,672 B2 | 3/2006 | Seo et al. |
| 7,023,516 B2 | 4/2006 | Yoshida et al. |
| 7,110,074 B2 | 9/2006 | Takeda et al. |
| 7,154,569 B2 | 12/2006 | Lee et al. |
| 7,167,224 B1 | 1/2007 | Takeda et al. |
| 7,193,672 B2 | 3/2007 | Takeda et al. |
| 7,224,421 B1 | 5/2007 | Takeda et al. |
| 7,227,606 B2 | 6/2007 | Takeda et al. |
| 7,247,411 B2 | 7/2007 | Song |
| 7,294,854 B2 | 11/2007 | Kim et al. |
| 7,304,703 B1 | 12/2007 | Takeda et al. |
| 7,307,684 B2 | 12/2007 | Ham et al. |
| 7,321,412 B2 | 1/2008 | Sasaki et al. |
| 7,342,629 B2 | 3/2008 | Yoshida et al. |
| 7,385,660 B2 | 6/2008 | Kume et al. |
| 7,385,662 B2 | 6/2008 | Yoshida et al. |
| 7,425,997 B2 | 9/2008 | Kim |
| 7,443,475 B2 | 10/2008 | Kume et al. |
| 7,586,573 B2 | 9/2009 | Yoshida et al. |
| 7,630,046 B2 | 12/2009 | Ono et al. |
| 7,649,584 B2 | 1/2010 | Lee |
| 7,760,305 B2 | 7/2010 | Takeda et al. |
| 7,787,092 B2 | 8/2010 | Mizusako et al. |
| 7,791,698 B2 | 9/2010 | Hirota |
| 7,821,603 B2 | 10/2010 | Takeda et al. |
| 2001/0004274 A1 | 6/2001 | Sakamoto et al. |
| 2001/0007487 A1 | 7/2001 | Yoon et al. |
| 2001/0022643 A1 | 9/2001 | Kim et al. |
| 2001/0024257 A1 | 9/2001 | Kubo et al. |
| 2002/0036740 A1 | 3/2002 | Kubo et al. |
| 2002/0071081 A1 | 6/2002 | Cheng |
| 2002/0075437 A1 | 6/2002 | Fukumoto et al. |
| 2002/0080320 A1 | 6/2002 | Suzuki et al. |
| 2002/0149728 A1 | 10/2002 | Ogishima et al. |
| 2002/0180901 A1 | 12/2002 | Kim |
| 2002/0180920 A1 | 12/2002 | Noh et al. |
| 2003/0030769 A1 | 2/2003 | Hong et al. |
| 2003/0071930 A1 | 4/2003 | Nagahiro |
| 2003/0112398 A1 | 6/2003 | Kim et al. |
| 2003/0147027 A1 | 8/2003 | Wachi |
| 2004/0046907 A1 | 3/2004 | Ham et al. |
| 2004/0046914 A1 | 3/2004 | Hirota |
| 2004/0046915 A1 | 3/2004 | Takeda et al. |
| 2004/0075780 A1 | 4/2004 | Lee |
| 2004/0090580 A1 | 5/2004 | Liao et al. |
| 2004/0105058 A1 | 6/2004 | Lu |
| 2004/0150764 A1 | 8/2004 | Kubo et al. |
| 2004/0189914 A1 | 9/2004 | Matsuyama |
| 2004/0233360 A1 * | 11/2004 | Yoshida et al. ............ 349/114 |
| 2004/0246416 A1 | 12/2004 | Maeda |
| 2005/0007529 A1 | 1/2005 | Kim et al. |
| 2005/0068482 A1 | 3/2005 | Kume et al. |
| 2005/0151907 A1 | 7/2005 | Maeda |
| 2005/0206795 A1 * | 9/2005 | Shin et al. ............ 349/43 |
| 2006/0082709 A1 | 4/2006 | Hung et al. |
| 2006/0114397 A1 | 6/2006 | Mizusako et al. |
| 2007/0030421 A1 | 2/2007 | Sasaki et al. |
| 2007/0064187 A1 | 3/2007 | Takeda et al. |
| 2007/0229744 A1 | 10/2007 | Yamaguchi et al. |
| 2008/0165314 A1 | 7/2008 | Takeda et al. |
| 2008/0316406 A1 | 12/2008 | Inoue et al. |
| 2009/0268140 A1 | 10/2009 | Maeda |
| 2011/0058134 A1 | 3/2011 | Inoue et al. |

FOREIGN PATENT DOCUMENTS

| | | |
|---|---|---|
| CN | 1495492 A | 5/2004 |
| CN | 1641424 A | 7/2005 |
| JP | 6-043461 A | 2/1994 |
| JP | 2565639 B2 | 2/1994 |
| JP | 10-274771 A | 10/1998 |
| JP | 11-109393 A | 4/1999 |
| JP | 2001-242466 A | 9/2001 |
| JP | 2002-014331 A | 1/2002 |
| JP | 2002-287158 A | 10/2002 |
| JP | 2003-029283 A | 1/2003 |
| JP | 2004-004460 A | 1/2004 |
| KR | 0148502 B1 | 5/1998 |
| KR | 2000-0056511 A | 9/2000 |
| KR | 2000-0059783 A | 10/2000 |
| KR | 2001-0039258 A | 5/2001 |
| KR | 2001-0069132 A | 7/2001 |
| KR | 2002-0020457 A | 3/2002 |
| KR | 2002-0084097 A | 11/2002 |
| KR | 2003-0044872 A | 6/2003 |
| KR | 2003-0058012 A | 7/2003 |
| TW | 510981 | 11/2002 |
| TW | 569168 | 1/2004 |
| TW | 594310 | 6/2004 |
| TW | 200422710 A | 11/2004 |
| TW | 200612138 A | 4/2006 |
| WO | WO 03/032067 A1 | 4/2003 |
| WO | 03/075077 A2 | 9/2003 |
| WO | WO 03/096114 A1 | 11/2003 |
| WO | 2004/019122 A1 | 3/2004 |

OTHER PUBLICATIONS

Related U.S. Appl. No. 11/288,522, filed Nov. 29, 2005; Inventor: M. Yamaguchi.

Related U.S. Appl. No. 11/288,251, filed Nov. 29, 2005; Inventor: R. Mizusako.

Taiwanese Office Action dated Feb. 1, 2008 issued in counterpart Taiwanese application and English translation thereof.

Chinese Office Action (and English translation thereof) dated Apr. 18, 2008, issued in a counterpart Chinese Application.

U.S. Appl. No. 11/182,233, filed Jul. 15, 2005; R. Mizusako; Vertical Alignment Liquid Crystal Display Device.

U.S. Appl. No. 11/214,510, filed Aug. 30, 2005; R. Mizusako; Vertical Alignment Active Matrix Liquid Crystal Display Device.

U.S. Appl. No. 11/237,020, filed Sep. 28, 2005; R. Mizusako et al; Vertical Alignment Active Matrix Liquid Crystal Display Device.

U.S. Appl. No. 11/238,027, filed Sep. 28, 2005; R. Mizusako et al; Vertical Alignment Active Matrix Liquid Crystal Display Device.

Mizusako, et al., "Vertical Alignment Active Matrix Liquid Crystal Display Device," filed Mar. 24, 2009, related U.S. Appl. No. 12/410,223.

Japanese Office Action dated May 25, 2010 and English translation thereof, issued in counterpart Japanese Application No. 2004-375018.

Japanese Office Action dated Aug. 24, 2010 and English translation thereof in counterpart Japanese Application No. 2004-377374.

Japanese Office Action dated Feb. 8, 2011, and English translation thereof, issued in counterpart Japanese Application No. 2004-377374.

Japanese Office Action dated Sep. 28, 2010 (and English translation thereof) in counterpart Japense Application No. 2004-375018.

Japanese Office Action dated Jan. 11, 2011 (and English translation thereof) in counterpart Japanese Application No. 2004-375018.

Japanese Office Action (Decision of Refusal) dated Jan. 11, 2011 (and English translation thereof) in counterpart Japanese Application No. 2004-375018.

U.S. Appl. No. 11/692,635; First Named Inventor: M. Yamaguchi: Title: "Vertically Aligned Liquid Crystal Display Device"; Filed: Mar. 28, 2007.

Chinese Office Action dated Jan. 28, 2011 (and English translation thereof) in counterpart Chinese Application No. 200910173178.5.

* cited by examiner

VERTICAL ALIGNMENT LIQUID CRYSTAL DISPLAY DEVICE IN WHICH A PIXEL ELECTRODE HAS SLITS WHICH DIVIDE THE PIXEL ELECTRODE INTO ELECTRODE PORTIONS

BACKGROUND OF THE INVENTION

1. Field of the Invention

The present invention relates to a vertical alignment active matrix liquid crystal display device using a thin film transistor (hereinafter referred to as TFT) as an active element.

2. Description of the Related Art

A vertical alignment liquid crystal display device comprises a pair of substrates opposite to each other with a predetermined gap therebetween, a plurality of pixel electrodes arranged in a matrix of rows and columns on the inner surface of one substrate of the opposing inner surfaces of the pair of substrate, a plurality of TFTs arranged on the inner surface of the one substrate correspondingly to the plurality of pixel electrodes and connected to the corresponding pixel electrodes, a plurality of gate lines and data lines formed on the inner surface of the one substrate respectively between the rows of pixel electrodes and the columns of pixel electrodes for supplying a gate signal and a data signal to the TFTs on the corresponding rows and columns, an opposing electrode formed on the inner surface of the other substrate so as to oppose to each of the plurality of pixel electrodes, vertical alignment films formed so as to cover the electrodes on the inner surfaces of the front substrate and back substrate respectively, and a liquid crystal layer having a negative dielectric anisotropy filled in the gap between the front substrate and the back substrate.

The vertical alignment liquid crystal display device displays an image by aligning liquid crystal molecules being in the vertically aligned state to lie down by applying a voltage between each of the pixel electrodes and the opposing electrode, in each of a plurality of pixels that are defined in the areas where the plurality of pixel electrodes and the opposing electrode face each other. As the voltage is applied, the liquid crystal molecules in each pixel are so aligned as to lie down to the substrate.

Such a vertical alignment liquid crystal display device causes variation in the state of lying alignment of the liquid crystal molecules in accordance with the voltages applied to the respective pixels, resulting in display unevenness.

Hence, in order to stabilize the alignment state of each pixel and obtain a wider view angle characteristic, it is proposed to form a plurality of domains where the liquid crystal molecules are aligned along plural directions pixel by pixel. For instance, as described in the specification of Japanese Patent Publication No. 2565639, a liquid crystal display apparatus proposed has the opposing electrode formed with a slit with the shape of a letter X, so that the liquid crystal molecules in each pixel are so aligned as to tilt toward the center of the X-shaped slit along the four directions when a voltage is applied between the two electrodes facing each other.

However, since it is required in this liquid crystal display device that the domains be formed which has different alignment directions from each other due to the X-shaped slit formed in each pixel, the X-shaped slit needs to be formed to have a sufficiently large width in order to prohibit the interaction between the domains. This increases the area of the slit, which is not controllable by electric fields, in each pixel, thereby reduces the area where the opposing electrode and the pixel electrode face each other, resulting in a low aperture ratio.

SUMMARY OF THE INVENTION

An object of the present invention is to provide a vertical alignment active matrix liquid crystal display device which can achieve bright display and a wide view angle with no display unevenness, and can display an image of a high-quality by aligning the liquid crystal molecules in each pixel stably into the lying alignment by applying a voltage.

To achieve the above object, a liquid crystal display device according to a first aspect of the present invention comprises:

a pair of substrates opposing to each other with a predetermined gap therebetween;

at least one opposing electrode formed on an inner surface of one substrate of the pair of substrates;

a plurality of pixel electrodes arranged in a matrix of a row direction and a column direction on an inner surface of the other substrate of the pair of substrates, each defining a pixel in an area where each faces the opposing electrode, and each having at least one slit for separating each into a plurality of electrode portions to divide each pixel into a plurality of sub-pixels, which slit is formed by eliminating a part of each pixel electrode so as to leave un-eliminated a connecting portion which has a predetermined width, at which adjoining electrode portions of each pixel electrode are connected with each other, and whose width is formed so as to be smaller than ⅕ of a width of each pixel electrode which width runs in a direction in which the slit is formed;

a plurality of thin film transistors formed on the inner surface of the other substrate so as to correspond to the plurality of pixel electrodes respectively, and connected to the corresponding pixel electrodes respectively;

a plurality of gate lines and data lines formed on the inner surface of the other substrate between rows and columns of the plurality of pixel electrodes respectively, for supplying a gate signal and a data signal to the thin film transistors on the corresponding rows and columns;

vertical alignment films formed on the inner surfaces of the one and the other substrates respectively, so as to cover the pixel electrodes and the opposing electrode; and a liquid crystal layer filled in the gap between the pair of substrates and having a negative dielectric anisotropy.

The liquid crystal display device according to the first aspect provides each pixel electrode with at least one slit for separating the pixel electrode into a plurality of electrode portions to divide one pixel into a plurality of sub-pixels, by eliminating a part of the pixel electrode with a connecting portion kept that has a predetermined width for connecting sub-pixels of adjoining electrode portions of the pixel electrode, and has the width of the connecting portion formed to be smaller than ⅕ of the width of the pixel electrode which width of the pixel electrode runs in the direction in which the slit is formed. Thus, when a voltage is applied, the liquid crystal molecules in each pixel can be stably aligned into a lying alignment, sub-pixel by sub-pixel corresponding to the plurality of electrode portions, from the periphery of the sub-pixels toward the center of the sub-pixels, without being influenced by the alignment of the liquid crystal molecules in the other sub-pixels corresponding to the adjoining electrode portion. Accordingly, a high-quality image with no display roughness can be displayed, and a bright image can be displayed because the aperture ratio of each pixel is not lowered.

In the present liquid crystal display device, it is preferred that a width $W_1$ as the width of the pixel electrode that runs in the direction in which the slit is formed and a width $W_2$ as the width of the connecting portion at which adjoining electrode portions of each pixel electrode are connected with each other be set to values which satisfy $W_2/W_1 \leq 0.13$.

It is further preferred that a width of the slit of each pixel electrode be 4.0 μm or smaller.

In the present liquid crystal display device, it is further preferred that each of the plurality of pixel electrodes be formed in an elongated shape having shorter sides and longer sides, have the thin film transistor connected to one end of one of the shorter sides thereof, and be provided with the at least one slit which extends in a direction parallel with the shorter sides for separating the pixel electrode into the plurality of electrode portions, and each of the plurality of separated electrode portions of the pixel electrode be formed in substantially a shape of a square.

A liquid crystal display device according to a second aspect of the present invention comprises:

a pair of substrates opposing to each other with a predetermined gap therebetween;

at least one opposing electrode formed on an inner surface of one substrate of the pair of substrates;

a plurality of pixel electrodes arranged in a matrix of a row direction and a column direction on an inner surface of the other substrate of the pair of substrates, each defining a pixel in an area where each faces the opposing electrode, and each having at least one slit for separating each into a plurality of electrode portions to divide each pixel into a plurality of sub-pixels, which slit is formed by eliminating a part of each pixel electrode so as to leave un-eliminated a connecting portion which has a predetermined width, at which adjoining electrode portions of each pixel electrode are connected with each other, and which is formed at a position off a center of a width of each pixel electrode which width runs in a direction in which the slit is formed, toward one side of the width of the pixel electrode;

a plurality of thin film transistors formed on the inner surface of the other substrate so as to correspond to the plurality of pixel electrodes respectively, and connected to the corresponding pixel electrodes respectively;

a plurality of gate lines and data lines formed on the inner surface of the other substrate between rows and columns of the plurality of pixel electrodes respectively, for supplying a gate signal and a data signal to the thin film transistors on the corresponding rows and columns;

vertical alignment films formed on the inner surfaces of the one and the other substrates respectively, so as to cover the pixel electrodes and the opposing electrode; and a liquid crystal layer filled in the gap between the pair of substrates and having a negative dielectric anisotropy.

The liquid crystal display device according the second aspect provides each pixel electrode with at least one slit for separating the pixel electrode into a plurality of electrode portions to divide each pixel into a plurality of sub-pixels, by eliminating a part of the pixel electrode with a connecting portion kept that has a predetermined width for connecting adjoining electrode portions of the pixel electrode, and has the connecting portion formed at a position that is off the center of the width of the pixel electrode which width runs in the direction in which the slit is formed, toward one of the both sides of that width of the pixel electrode. Therefore, when a voltage is applied, the liquid crystal molecules in each pixel can be stably aligned into a lying alignment, sub-pixel by sub-pixel corresponding to the plurality of electrode portions of each pixel electrode, from the periphery of the sub-pixel toward the center of the sub-pixel, without being influenced by the alignment of the liquid crystal molecules in the sub-pixel corresponding to the adjoining electrode portion. Accordingly, a high-quality image with no display roughness can be displayed, and a bright image can be displayed because the aperture ratio of each pixel is not lowered.

In the present liquid crystal display device, it is preferred that each of the plurality of pixel electrodes be formed in an elongated shape having shorter sides and longer sides, have the thin film transistor connected to one end of one of the shorter sides thereof, be provided with the at least one slit which extends in a direction parallel with the shorter sides for separating the pixel electrode into the plurality of electrode portions, and have the connecting portion at which the plurality of electrode portions are connected with each other formed at the longer side that is opposite to the longer side to which the thin film transistor is closer. In this case, it is preferred that each of the plurality of pixel electrodes have an elongated shape whose longer sides are substantially three times larger than the shorter sides, and be provided with at least two slits for separating the pixel electrode into at least three or more electrode portions in a direction of the longer sides, with connecting portions of the respective slits formed at opposite longer sides of the pixel electrode alternately.

Further in the present liquid crystal display device, it is preferred that each of the plurality of pixel electrodes be formed in substantially a shape of a rectangle having shorter sides and longer sides, have the thin film transistor connected at one end of one shorter side thereof, and be provided with a plurality of slits for separating the pixel electrode into a plurality of electrode portions which are arranged in two columns and two rows, with connecting portions at which adjoining electrode portions are connected with each other being formed between each of the plurality of electrode portions and its adjoining electrode portion in a same column and between each of the plurality of electrode portions and its adjoining electrode portion in a same row. In this case, it is preferred that the connecting portion at which, of the plurality of electrode portions, the electrode portion to which the thin film transistor is connected and the electrode portion adjoining this electrode portion is connected with each other be formed at one shorter side of the pixel electrode other than one longer side thereof that is closer to the thin film transistor.

Furthermore, it is preferred in the present liquid crystal display device that each of the plurality of electrode portions into which each pixel electrode is separated be formed in substantially a shape of a square.

Further, it is preferred that the present liquid crystal display device further comprise a compensating-capacitor electrode formed between a surface of the other substrate on which the plurality of pixel electrodes are provided and pixel electrodes, so as to correspond to a circumference of each of the plurality of pixel electrode and so as to partially overlap with the circumference of the pixel electrode while being insulated from the pixel electrode, for forming a compensating capacity between itself and the pixel electrode and for forming a region of an electric field having a predetermined value between itself and the opposing electrode. Furthermore, it is preferred that the present liquid crystal display device further comprise an auxiliary electrode formed between a surface of the other substrate and the plurality of pixel electrodes, so as to correspond to the slit of each of the plurality of pixel electrodes and so as to face the opposing electrode on the one substrate, for forming an electric field having a predetermined value between itself and the opposing electrode. Yet further, it is preferred that the present liquid crystal display device comprise both of the compensating-capacitor electrode and the auxiliary electrode.

A liquid crystal display device according to a third aspect of the present invention comprises:

a pair of substrates opposing to each other with a predetermined gap therebetween;

at least one opposing electrode formed on an inner surface of one substrate of the pair of substrates;

a plurality of pixel electrodes arranged in a matrix of a row direction and a column direction on an inner surface of the other substrate of the pair of substrates, each defining a pixel in an area where each faces the opposing electrode, and each having at least one slit for separating each into a plurality of electrode portions to divide each pixel into a plurality of sub-pixels having a shape of substantially a square, which slit is formed by eliminating a part of each pixel electrode so as to leave un-eliminated a connecting portion which has a predetermined width, and at which adjoining electrode portions of each pixel electrode are connected with each other;

a plurality of thin film transistors formed on the inner surface of the other substrate so as to correspond to the plurality of pixel electrodes respectively, and which are connected to the corresponding pixel electrodes respectively;

a plurality of gate lines and data lines formed on the inner surface of the other substrate between rows and columns of the plurality of pixel electrodes respectively, for supplying a gate signal and a data signal to the thin film transistors on the corresponding rows and columns;

vertical alignment films formed on the inner surfaces of the one and the other substrates respectively, so as to cover the pixel electrodes and the opposing electrode;

a liquid crystal layer filled in the gap between the pair of substrates and having a negative dielectric anisotropy; and an auxiliary electrode formed between a surface of the other substrate on which the plurality of pixel electrodes are provided and these pixel electrodes, so as to correspond to a circumference of each of the plurality of pixel electrodes and the slit while being insulated from each pixel electrode, for forming a region between itself and the opposing electrode in which region an electric field having a predetermined value is generated.

The liquid crystal display device according to the third aspect provides each pixel electrode with at least one slit for separating the pixel electrode into a plurality of electrode portions to divide each pixel into a plurality of sub-pixels having a shape of substantially a square, by eliminating a part of the pixel electrode with a connecting portion kept that has a predetermined width for connecting the sub-pixels of adjoining electrode portions of the pixel electrode, and has an auxiliary electrode formed between the surface of the other substrate on which the plurality of pixel electrodes are provided and a plane on which these pixel electrodes are formed so as to correspond to the circumference of each of the plurality of pixel electrodes and the slit while being insulted from the pixel electrodes, for forming a region between itself and the opposing electrode in which region an electric field having a predetermined value is generated. Therefore, when a voltage is applied, the liquid crystal molecules in each pixel can be stably aligned into a lying alignment, sub-pixel by sub-pixel corresponding to the plurality of electrode portions of each pixel electrode, from the periphery of the sub-pixel toward the center of the sub-pixel, without being influenced by the alignment of the liquid crystal molecules in the sub-pixel corresponding to the adjoining electrode portion. Accordingly, a high-quality image with no display roughness can be displayed, and a bright image can be displayed because the aperture ratio of each pixel is not lowered.

In the present liquid crystal display device, it is preferred that the auxiliary electrode be formed along the circumference of each pixel electrode and along edges of the electrode portions which are separated by the slit, so as to partially overlap with the circumference and the electrode portions. In this case, it is preferred that the auxiliary electrode form a compensating-capacitor electrode for forming a compensating capacity between itself and the opposing electrode. Further, it is preferred that an electric potential of the auxiliary electrode be set to substantially a same value as an electric potential of the opposing electrode.

It is preferred that the present liquid crystal display device further comprise protrusions formed on the inner surface of the one substrate on which the opposing electrode is formed, at positions corresponding to a center of the respective electrode portions which are separated by the slit of each of the plurality of pixel electrode on the other substrate. With this structure, a stable state of alignment of the liquid crystal molecules can be obtained sub-pixel by sub-pixel corresponding to the electrode portions of each pixel, when a voltage is applied.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Liquid crystal display devices will be described below as embodiments of the present invention with reference to the accompanying drawings.

First Embodiment

Figure 1:
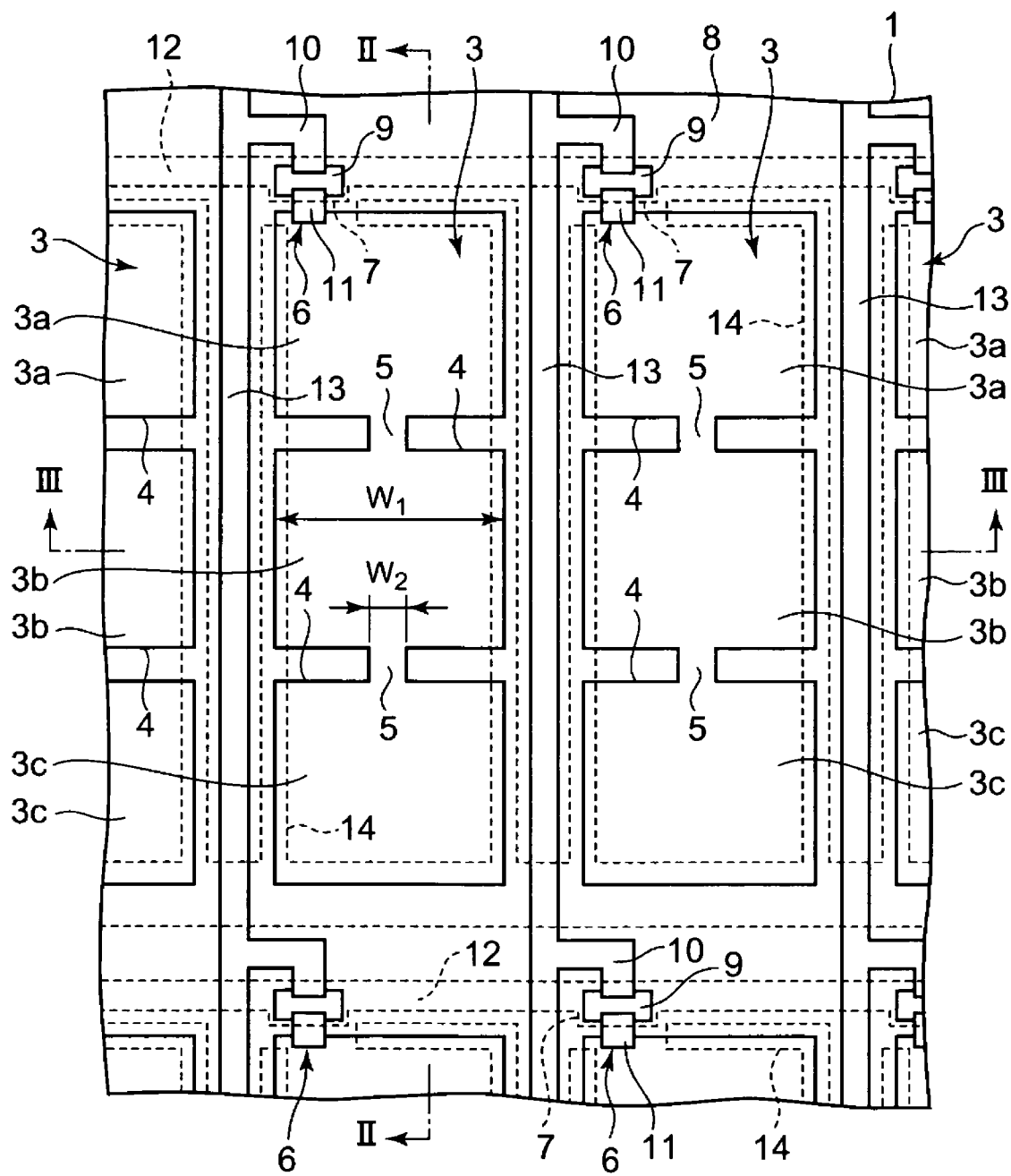
FIG. 1 is a plan view of one part of one substrate of a liquid crystal display device as the first embodiment of the present invention.
Figure 2:
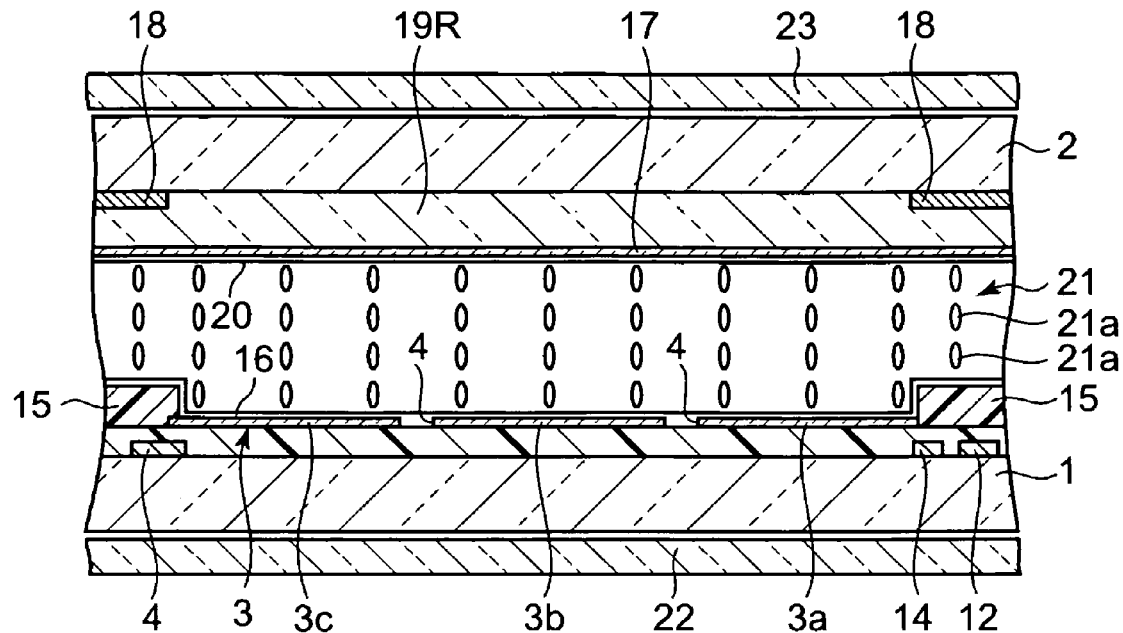
FIG. 2 is a cross sectional view of the liquid crystal display device of FIG. 1 as cut along the line II-II.
Figure 3:
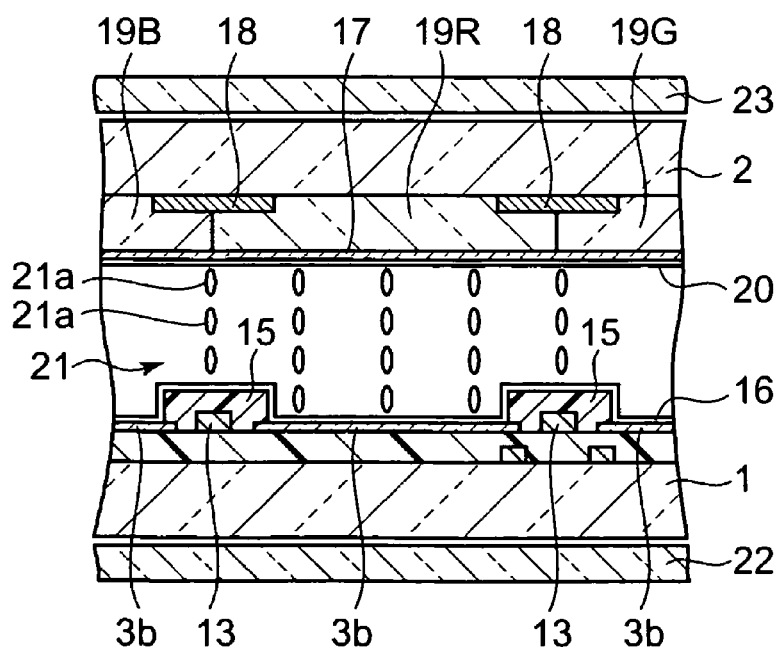
FIG. 3 is a cross sectional view of the liquid crystal display device of FIG. 1 as cut along the line III-III.

FIG. 1 to FIG. 4 show the first embodiment of the present invention, where FIG. 1 is a plan view of a liquid crystal display device showing one part of a substrate on which pixel electrodes are formed, and FIG. 2 and FIG. 3 are cross sections of the liquid crystal display device of FIG. 1, as cut along the line II-II and the line III-III respectively.

The liquid crystal display device is a vertical alignment active matrix liquid crystal display device, and comprises a pair of transparent substrates 1 and 2 opposite to each other with a predetermined gap therebetween as shown in FIG. 1 to FIG. 3. At least one transparent opposing electrode 17 is formed on the inner surface of one substrate of the opposing inner surfaces of the pair of substrates 1 and 2, for example, on the inner surface of the substrate 2 on the viewer side (hereinafter referred to as front substrate). Formed on the inner surface of the other substrate of the opposing inner surfaces of the pair of substrates 1 and 2, i.e., on the inner surface of the substrate 1 counter to the display viewing position (hereinafter referred to as rear substrate) are a plurality of transparent pixel electrodes 3 arranged in a matrix of a row direction (left and right direction in FIG. 1) and a column direction (upward and downward direction in FIG. 1) to each define a pixel in the area where each faces the opposing electrode 17, a plurality of TFTs 6 formed correspondingly to the plurality of pixel electrodes 3 and connected to the corresponding pixel electrodes 3 respectively, and a plurality of gate lines 12 and data lines 13 formed between the rows of pixel electrodes and the columns of pixel electrodes to supply a gate signal and a data signal to the TFTs 6 on the corresponding rows and columns. Vertical alignment films 16 and 20 are formed on the inner surfaces of the pair of substrates 1 and 2 respectively, so as to cover the electrodes 3 and 17. A liquid crystal layer 21 having a negative dielectric anisotropy is filled in the gap between the pair of substrates 1 and 2.

The plurality of TFTs 6 comprise a gate electrode 7 formed on the surface of the rear substrate 1, a transparent gate insulation film 8 formed so as to cover the gate electrode 7 and extend over the entire region where the pixel electrode 3 is to be arranged, an i-type semiconductor film 9 formed on the gate insulation film 8 so as to be opposite to the gate electrode 7, and a drain electrode 10 and source electrode 11 formed on the one and the other edges of the i-type semiconductor film 9 via an unillustrated n-type semiconductor film.

The plurality of pixel electrodes 3 are formed on the gate insulation film 8. In order to increase the pixel density and improve the definition of the liquid crystal display device, the pixel electrodes 3 are formed in an elongated shape having longer sides in the column direction (direction along the data lines 13) and shorter sides in the row direction (direction along the gate lines 12), with the longer sides being substantially three times the length of the shorter sides. The TFT 6 is arranged at one end of one shorter-side edge of the elongated-shaped pixel electrode 3, with its source electrode 11 connected to a corresponding edge portion of the pixel electrode 3.

Each of the plurality of pixel electrodes 3 is provided with slits 4 which separate the pixel electrode 3 into a plurality of electrode portions which are connected with each other at part of the adjoining edges thereof at which they are separated from each other. That is, each pixel electrode 3 is provided with at least one slit which separates the pixel electrode 3 into a plurality of electrode portions to divide one pixel into a plurality of sub-pixels. The slit is formed by partially eliminating the pixel electrode 3 with a connecting portion 5 having a predetermined width left, at which the regions of adjoining electrode portions of one pixel electrode 3 are connected. The slit 4 is formed to have a width of, for example, 4.0 μm or smaller.

According to the present embodiment, the pixel electrode 3 is formed in an elongated shape whose width (length of the shorter sides) is approximately ⅓ of its length (length of the longer sides), and is separated into three electrode portions 3a, 3b, and 3c having substantially a shape of square, by forming slits 4 extending along the widthwise direction of the pixel electrode 3 at two positions that substantially trisect the length of the pixel electrode 3.

Further, according to the present embodiment, the slits 4 are formed such that the center of width of the pixel electrode 3 is left untouched to provide the both ends of each slit 4 at both side edges of the pixel electrode 3 so as to be opened thereat, thereby forming the connecting portions 5 that connect the electrode portions 3a, 3b, and 3c at the center of width.

Assuming that the width of the pixel electrode 3 that extends in a direction parallel with the slits 4 formed in the pixel electrode 3 for forming the electrode portions 3a, 3b, and 3c is $W_1$, and the width of the connecting portions 5 at which the electrode portions 3a and 3b, and the electrode portions 3b and 3c adjoin each other with the slits 4 therebetween is $W_2$ as shown in FIG. 1, the width $W_2$ of the connecting portions 5 is formed smaller than ⅕ of the width $W_1$ of the pixel electrode 3, so as not to be smaller than a limit at which the electric resistivity of the connecting portions 5 exceeds a tolerable value. More preferably, the width $W_2$ of the connecting portions 5 and the width $W_1$ of the pixel electrode 3 are set to values that satisfy $$W_2/W_1 \leq 0.13.$$

That is, according to the present embodiment, the width $W_2$ of the connecting portions 5 is set to a value which is equal to or smaller than 13/100 of the width $W_1$ of the electrode portions 3a, 3b, and 3c in the direction parallel with the slits 4, and at which the electric resistivity value of the connecting portions 5 does not go beyond a tolerable range.

Compensating-capacitor electrodes 14 are formed on the substrate of the rear substrate 1 correspondingly to the pixel electrodes 3 on each row along the circumference of each pixel electrode 3 except around the portion at which the source electrode 11 of the TFT 6 is connected. The compensating-capacitor electrode 14 faces each pixel electrode 3 via the gate insulation film 8 and forms a compensating capacity between itself and the pixel electrode 3 with the gate insulation film 8 serving as a dielectric layer.

The compensating-capacitor electrode 14 is positioned along the circumference of the pixel electrode 3 so as to partially overlap with the pixel electrode 3 with insulativity kept between them, and so as to be led out away from the circumference of the pixel electrode 3 to have a predetermined width.

The compensating-capacitor electrodes 14 corresponding to the pixel electrodes 3 on each row are integrally connected with each other on each row of pixel electrodes at one side of the pixel electrodes 3 opposite to the TFT connection side thereof. The compensating-capacitor electrodes 14 on each row are formed to extend to the outside of the region where the plurality of pixel electrodes 3 are formed, and connected in common to an unillustrated capacitor electrode connection line which is provided in parallel with the data line 13 at one outer edge or both outer edges of the region where the pixel electrodes 3 are arranged.

Further, an overcoat insulation film 15 which covers the plurality of TFTs 6 and the data lines 13 but not the plurality of pixel electrodes 3 is formed on the inner surface of the rear substrate 1, and the vertical alignment film 16 is formed on the overcoat insulation film 15.

On the other hand, formed on the inner surface of the front substrate 2 are a latticed black mask 18 which faces the regions between the plurality of pixels formed by the regions in which the plurality of pixel electrodes 3 formed on the inner surface of the rear substrate 1 and the opposing electrode 17 formed on the inner surface of the front substrate 2 are opposite to each other, and color filters 19R, 19G, and 19B having three colors of red, green, and blue that correspond to the plurality of pixels respectively. The opposing electrode 17 is formed on the color filters 19R, 19G, and 19B. The vertical alignment film 20 is formed on the opposing electrode 17.

The rear substrate 1 and the front substrate 2 are jointed to each other via an unillustrated frame-shaped sealing member that surrounds the region where the plurality of pixel electrodes 3 are arranged.

The rear substrate 1 has, though not illustrated, led-out portions which are led out toward the outside of the front substrate 2, at one end of the row direction and one end of the column direction respectively. A plurality of gate driver connection terminals are arranged on the led-out portion of the row direction, and a plurality of data driver connection terminals are arranged on the led-out portion of the column direction.

The plurality of gate lines 12 are led toward the led-out portion of the row direction to be connected to the plurality of gate driver connection terminals. The plurality of data lines 13 are led toward the led-out portion of the column direction to be connected to the plurality of data driver connection terminals. The unillustrated capacitor electrode connection line to which the compensating-capacitor electrodes 14 on each row are connected is led toward one or both of the led-out portions of the row and column directions to be connected to an unillustrated electric potential supply terminal having a predetermined electric potential, of the plurality of driver connection terminals on that led-out portion.

Furthermore, an opposing electrode connection line is formed on the inner surface of the rear substrate 1 so as to be led from near a corner of an unillustrated substrate-jointed portion where the substrates are jointed by the sealing member toward one or both of the led-out portions of the row and column directions to be connected to the electric potential supply terminal of the driver connection terminals. The opposing electrode 17 formed on the inner surface of the front substrate 2 is connected, at the substrate-jointed portion, to the opposing electrode connection line and further to the electric potential supply terminal through the opposing electrode connection line. That is, the electric potential of the plurality of compensating-capacitor electrodes 14 is made equal to that of the opposing electrode 17.

The liquid crystal layer 21 is filled in the region surrounded by the sealing member between the rear substrate 1 and front substrate 2, and the liquid crystal molecules 21a of the liquid crystal layer 21 are aligned generally perpendicularly to the substrates 1 and 2 due to the vertical aligning property of the vertical aligning films 16 and 20 formed on the inner surfaces of the substrates 1 and 2 respectively.

Polarizing plates 22 and 23 are disposed on the external surfaces of the rear substrate 1 and front substrate 2 respectively, with their transmission axes aligned in predetermined directions. According to the present embodiment, the transmission axes of the polarizing plates 22 and 23 are aligned so as to be substantially orthogonal to each other, so as to permit the liquid crystal display device to perform display of a normally black mode.

The present liquid crystal display device is provided with the slits 4 that separate each of the plurality of pixel electrodes 3 into the plurality of electrode portions 3a, 3b, and 3c that are connected at the connecting portions 5, thereby aligning the liquid crystal molecules 21a in each pixel into a lying alignment that is varied sub-pixel by sub-pixel corresponding to the plurality of electrode portions 3a, 3b, and 3c, when a voltage is applied between the pixel electrodes 3 and the opposing electrode 17. Further, in the liquid crystal display device, the width $W_1$ of the plurality of electrode portions 3a, 3b, and 3c of the pixel electrode 3 and the width $W_2$ of the connecting portions 5 of the electrode portions 3a, 3b, and 3c are connected are set so as to satisfy $W_2/W_1 \leq 0.13$. Thus, when a voltage is applied, the liquid crystal molecules 21a in each pixel can be aligned into an orderly lying alignment from the periphery of each sub-pixel toward the center of the sub-pixel, sub-pixel by sub-pixel corresponding to the plurality of electrode portions 3a, 3b, and 3c.

Figure 4:
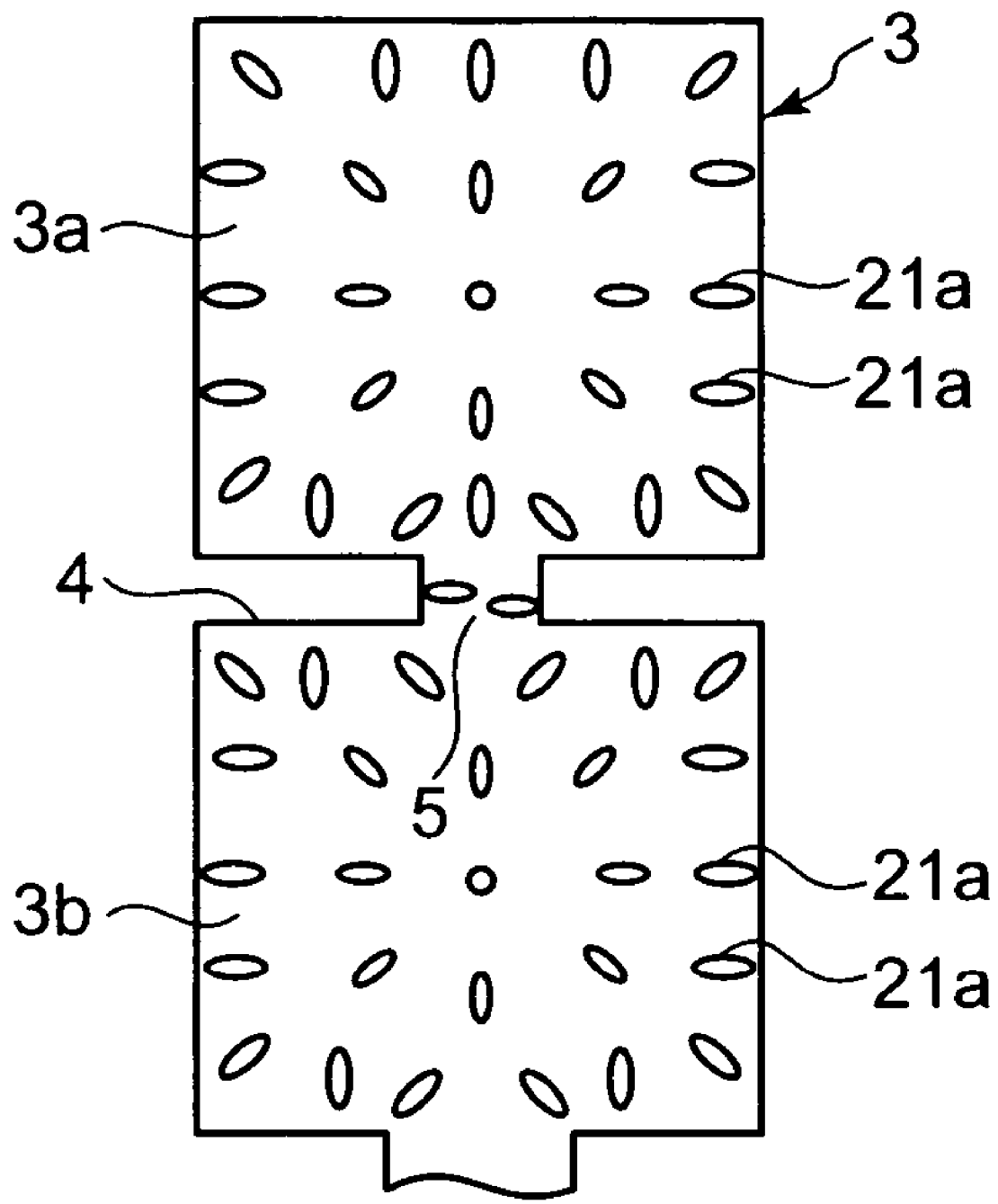
FIG. 4 is a plan view exemplarily showing a state of alignment of liquid crystal molecules in each sub-pixel corresponding to each of a plurality of electrode portions of a pixel electrode of the liquid crystal display device according to the first embodiment, when a voltage is applied.

FIG. 4 is a plan view exemplarily showing the state of alignment of the liquid crystal molecules in the sub-pixels corresponding to the plurality of electrode portions 3a, 3b, and 3c of the pixel electrode 3 of the liquid crystal display device according to the present embodiment, when a voltage is applied. As shown in FIG. 4, in the liquid crystal display device according to the present embodiment in which the width $W_1$ of the plurality of electrode portions 3a, 3b, and 3c of the pixel electrode 3 and the width $W_2$ of the connecting portions 5 of the electrode portions 3a, 3b, and 3c are set to satisfy $W_2/W_1 \leq 0.13$, the liquid crystal molecules 21a in the sub-pixels corresponding to the electrode portions 3a, 3b, and 3c of the pixel electrode 3 that adjoin each other with the slits 4 formed therebetween are aligned with almost no influences induced at the connecting portions 5, and are brought into an orderly lying alignment sub-pixels by sub-pixels corresponding to the plurality of electrode portions 3a, 3b, and 3c of the pixel electrode 3, from the periphery of the sub-pixel toward the center of the sub-pixels.

As compared with this, if the width $W_2$ of the connecting portions 5 of the electrode portions 3a, 3b, and 3c is made larger than ⅕ of the width $W_1$ of the plurality of electrode portions 3a, 3b, and 3c of the pixel electrode 3, the liquid crystal molecules 21a in the sub-pixels corresponding respectively to the electrode portions 3a, 3b, and 3c of the pixel electrode 3 adjoining each other with the slits 4 formed therebetween are mutually influenced at the connecting portions 5, thereby the liquid crystal molecules 21a in the adjoining electrode portions 3a and 3b are aligned to lie down in the same direction, failing to obtain a uniform alignment that is separate electrode-portion by portion. In a case where the ratio of the width $W_2$ of the connecting portions 5 of the electrode portions 3a, 3b, and 3c to the width $W_1$ of the electrode portions 3a, 3b, and 3c is $W_2/W_1 > 0.13$, a sufficiently stable alignment cannot be obtained.

Accordingly, the liquid crystal display device of the present embodiment can display a high-quality image with no display roughness, by setting the ratio of the width $W_2$ of the connecting portions 5 of the electrode portions 3a, 3b, and 3c to the width W₁ of the electrode portions 3a, 3b, and 3c to W₂/W₁≦0.13 to align the liquid crystal molecules 21a in each pixel stably into a lying alignment from the periphery of the sub-pixels toward the center of the sub-pixels sub-pixel by sub-pixel corresponding to the plurality of electrode portions 3a, 3b, and 3c of the pixel electrode 3, when a voltage is applied.

Furthermore, since the present liquid crystal display device has each of the plurality of electrode portions 3a, 3b, and 3c of the pixel electrode 3 formed in substantially a shape of square, the liquid crystal molecules 21a in each sub-pixels corresponding to the electrode portions 3a, 3b, and 3c of the pixel electrode 3 can be aligned in a lying alignment with a fine balance, from the periphery of the sub-pixel toward the center of the sub-pixels, making the lying alignment of the liquid crystal molecules 21a in each sub-pixels corresponding to the plurality of electrode portions 3a, 3b, and 3c of the pixel electrode 3 more stable, contributing to displaying an image of a much higher quality.

Further, the liquid crystal display device is provided with the slits 4 that separates the pixel electrode 3 into the plurality of electrode portions 3a, 3b, and 3c in each of the plurality of pixel electrodes 3. As the width of each slit 4 is equal to or 4.0 μm or smaller as described above, a sufficient aperture ratio can be obtained.

Second Embodiment

Figure 5:
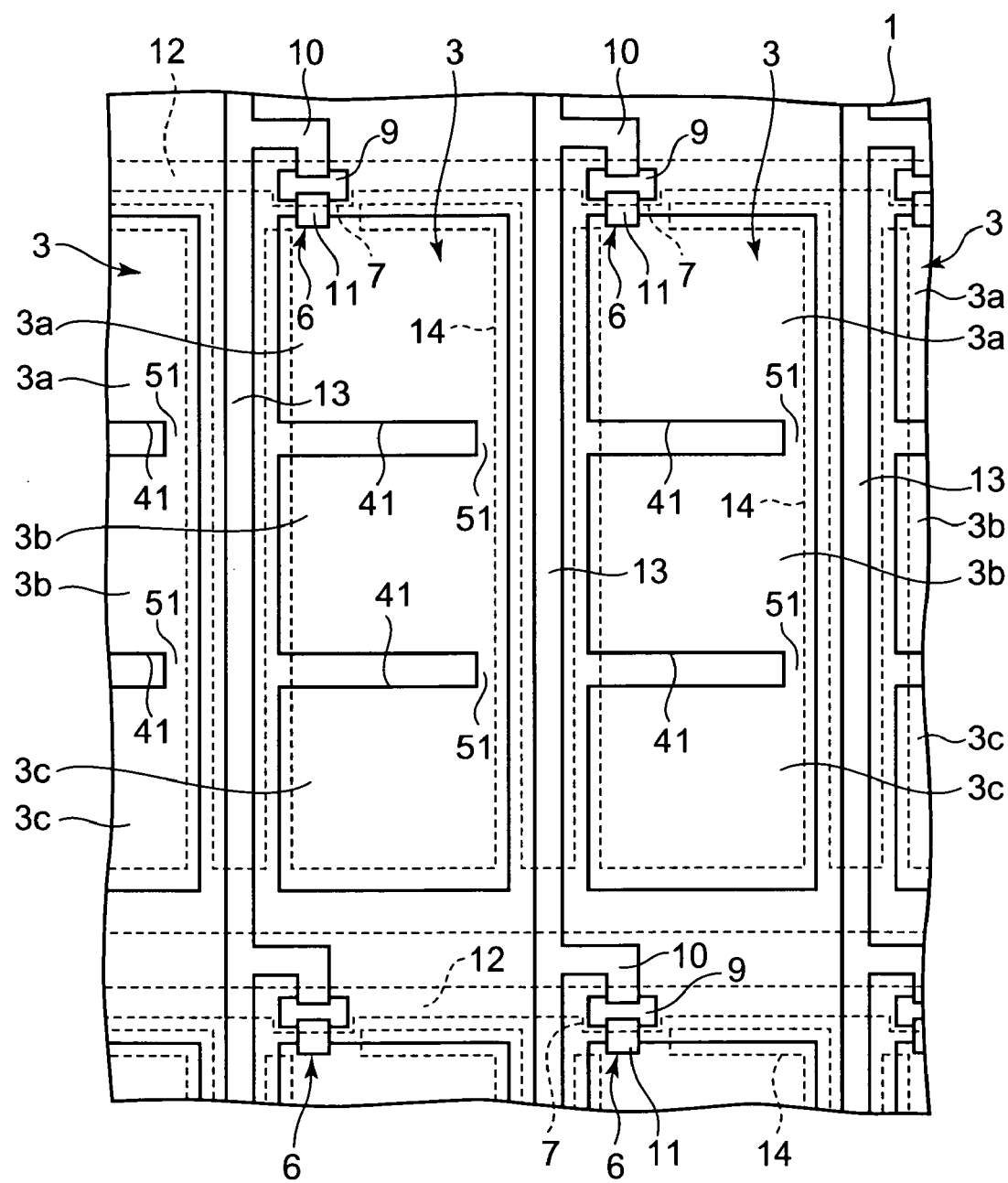
FIG. 5 is a plan view of one part of one substrate of a liquid crystal display device as the second embodiment of the present invention.

FIG. 5 is a plan view of one part of one substrate of a liquid crystal display device as the second embodiment of the present invention. In the present embodiment, the components same as those in the first embodiment will be given the same reference numerals, and explanation for such components will be omitted.

The liquid crystal display device according to the present embodiment is structured as follows: the plurality of pixel electrodes 3 are formed in an elongated shape having shorter sides in the row direction and longer sides in the column direction; the source electrode 11 of each TFT 6 is connected to one end of one shorter side of each of the plurality of pixel electrodes 3; the pixel electrodes 3 are each provided with slits 41 which separate the pixel electrode 3 into a plurality of, for example, three electrode portions 3a, 3b, and 3c which are arranged side by side in the direction of the longer side; and connecting portions 51 at which the electrode portions 3a and 3b, and the electrode portions 3b and 3c are connected with each other are each formed at a position off the center of width of the electrode portions 3a, 3b, and 3c in the direction parallel with the slits 41 toward one side of the width of the electrode portions 3a, 3b, and 3c. The structure of the liquid crystal display device of the present invention is the same as that of the liquid crystal display device of the first embodiment in the other respects.

In the present liquid crystal display device, the connecting portion 51 at which, of the plurality of electrode portions 3a, 3b, and 3c of the pixel electrode 3, at least the electrode portion 3a to which the TFT 6 is connected and the electrode portion 3b adjoining the electrode portion 3a are connected with each other, is formed at the other end of the shorter side opposite to the one end of the shorter side at which the TFT 6 is connected.

Note that according to the present embodiment, the connecting portion 51 between the electrode portion 3a at one end of the pixel electrode 3 to which the TFT 6 is connected and the central electrode portion 3b adjoining the electrode portion 3a, and the connecting portion 51 between the central electrode portion 3b and the electrode portion 3c at the other end of the pixel electrode 3 are both formed at the other end of the shorter side opposite to the one end of the shorter side at which the TFT 6 is connected.

Likewise the first embodiment, the present liquid crystal display device provides each of the plurality of pixel electrodes 3 with the slits 41 that separate the pixel electrode 3 into the plurality of electrode portions 3a, 3b, and 3c which are connected with each other at part of the adjoining edges thereof, thereby aligning the liquid crystal molecules 21a in each pixel into a lying alignment that is varied sub-pixels by sub-pixels corresponding to the plurality of electrode portions 3a, 3b, and 3c, when a voltage is applied between the pixel electrodes 3 and the opposing electrode 17.

Since the liquid crystal display device according to the present embodiment has each of the connecting portions 51 formed at a position off the center of width of the electrode portions 3a, 3b, and 3c in the direction parallel with the slits 41 toward one side of the width of the electrode portions 3a, 3b, and 3c, the influence given by the alignment of the liquid crystal molecules 21a in the electrode portion 3a on the liquid crystal molecules 21a in the electrode portions 3b and 3c can be reduced, thereby the liquid crystal molecules 21a in each sub-pixel are brought into an orderly lying alignment from the periphery of the sub-pixels toward the center of the sub-pixels, sub-pixel by sub-pixels corresponding to the plurality of electrode portions 3a, 3b, and 3c of the pixel electrode 3, enabling a high-quality image with no display roughness to be displayed.

Further, since the present liquid crystal display device has at least the connecting portion 51 that is between, of the plurality of electrode portions 3a, 3b, and 3c of the pixel electrode 3, the electrode portion 3a to which the TFT 6 is connected and the electrode portion 3b adjoining the electrode portion 3a formed at an end of the shorter side opposite to the end at which the TFT 6 is connected, the disorder in the alignment of the liquid crystal molecules 21a caused by an electric field generated around the TFT 6 of the electrode portion 3a due to a gate signal supplied to the electrodes (particularly, the gate electrode) of the TFT 6 is hindered from influencing the liquid crystal molecules 21a in the sub-pixel corresponding to the electrode portion 3b adjoining the electrode portion 3a with the slit 41 of the pixel electrode 3 formed therebetween, making it possible to cause almost no disorder in the alignment of the liquid crystal molecules 21a in the electrode portion 3b.

Figure 6:
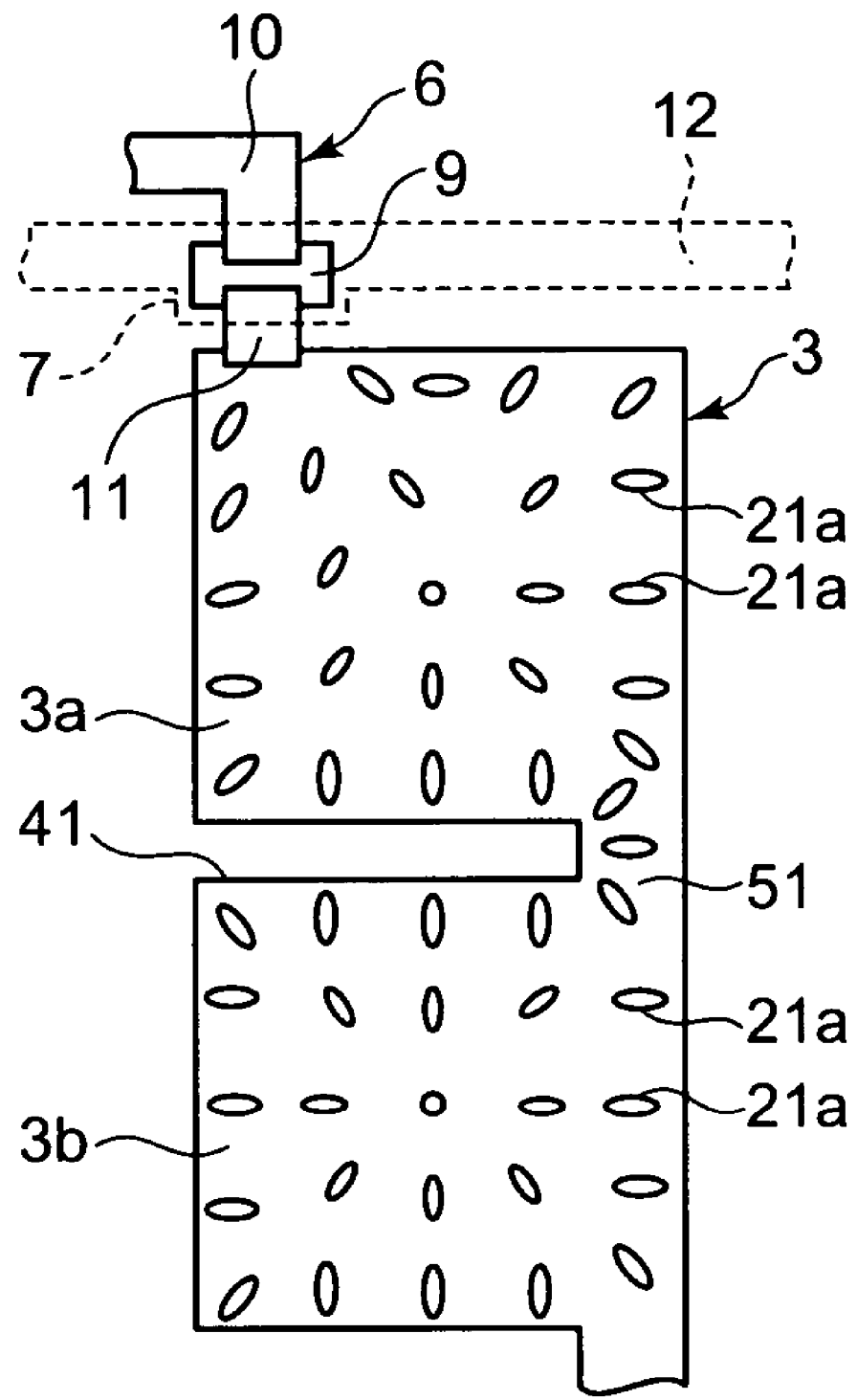
FIG. 6 is a plan view exemplarily showing a state of alignment of liquid crystal molecules in each sub-pixel corresponding to each of a plurality of electrode portions of a pixel electrode when a voltage is applied, due to the position of connecting portions of the electrode portions.

FIG. 6 is a plan view exemplarily showing the state of alignment of the liquid crystal molecules 21a in each sub-pixels corresponding to each of the plurality of electrode portions 3a, 3b, and 3c of the pixel electrode 3 when a voltage is applied, wherein this state of alignment appears due to the position of the connecting portions 51 of the electrode portions 3a, 3b, and 3c. Since, as shown in FIG. 6, the connecting portion 51 is positioned opposite to the extension line running in the direction of a lateral field generated between the gate electrode 7 of the TFT 6 and an edge of the electrode portion 3a that adjoins the TFT 6, the liquid crystal molecules 21a in the sub-pixels corresponding to the electrode portion 3a to which the TFT 6 is connected cause almost no disorder in their alignment due to the influence of the lateral field generated between the gate electrode 7 of the TFT 6 and the electrode portion 3a, but are brought into an orderly lying alignment from the periphery of the sub-pixels toward the center of the sub-pixels.

Therefore, the liquid crystal molecules 21a in the respective sub-pixels including the sub-pixel corresponding to the electrode portion 3a to which the TFT 6 is connected can be aligned stably into a lying alignment from the periphery of each sub-pixels toward the center of the sub-pixel, allowing a high-quality image to be displayed.

In the liquid crystal display device according to the present embodiment, it is preferred that each of the plurality of electrode portions 3a, 3b, and 3c of the pixel electrode 3 be formed in a shape of substantially a square. With this shape, the liquid crystal molecules 21a in the sub-pixel respectively corresponding to the plurality of electrode portions 3a, 3b, and 3c of the pixel electrode 3 can be aligned into a lying alignment with a fine balance, sub-pixel by sub-pixel, from the periphery of the sub-pixel toward the center of the sub-pixel.

Further, in the liquid crystal display device according to the present embodiment, it is preferred that the width $W_1$ as the width of the electrode portions 3a, 3b, and 3c in the direction parallel with the slits 41 and the width $W_2$ as the width of the connecting portions 51 be set to values that satisfy $W_2/W_1 \leq 0.13$, likewise the above-described first embodiment. With such values, the liquid crystal molecules 21a in each pixel can be more stably aligned into a lying alignment, sub-pixel by sub-pixel corresponding to the plurality of electrode portions 3a, 3b, and 3c of the pixel electrode 3, from the periphery of the sub-pixel toward the center of the sub-pixel, when a voltage is applied.

Furthermore, it is preferred that the width of the slits 41 of the pixel electrode 3 be 4.0 μm or smaller. With this width, a sufficient aperture ratio can be obtained.

Third Embodiment

Figure 7:
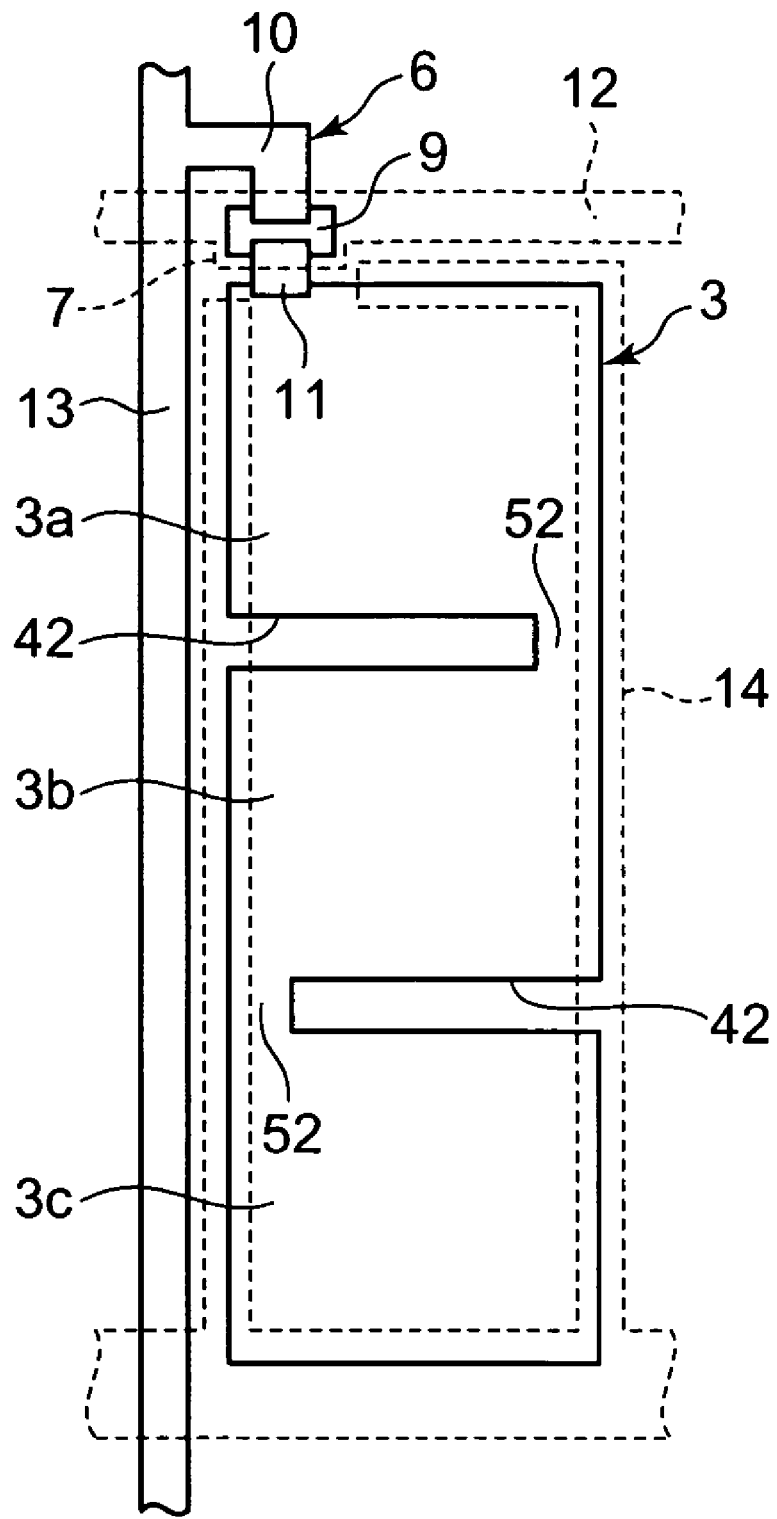
FIG. 7 is a plan view of one pixel on one substrate of a liquid crystal display device as the third embodiment of the present invention.

FIG. 7 is a plan view of one pixel on one substrate of a liquid crystal display device as the third embodiment of the present invention. In the present embodiment, the components same as those in the first and second embodiments will be given the same reference numerals, and explanation for such components will be omitted.

The liquid crystal display device according to the present embodiment is structured as follows; the pixel electrode 3 having an elongated shape is provided with a plurality of slits 42 which separate the pixel electrode 3 into three or more (three according to the present embodiment) electrode portions 3a, 3b, and 3c which are arranged side by side in the direction of the longer side of the pixel electrode 3; a connecting portion 52 at which, of the electrode portions 3a, 3b, and 3c of the pixel electrode 3, the electrode portion 3a to which the TFT 6 is connected and the electrode portion 3b adjoining the electrode portion 3a are connected with each other is formed at an end of the shorter side of the pixel electrode 3 that is opposite to the end at which the TFT 6 is connected; and the connecting portion 52 between the two electrode portions 3a and 3b adjoining each other while sandwiching therebetween a slit 42 of an odd ordinal number as counted from the TFT connection side among the plurality of slits 42, and a connecting portion 52 between the two electrode portions 3b and 3c adjoining each other while sandwiching therebetween a slit 42 of an even ordinal number are formed at opposite ends to each other. The structure of the liquid crystal display device of the present invention is the same as that of the liquid crystal display device of the second embodiment in the other respects.

That is, in the present liquid crystal display device, the connecting portion 52 at which, of the electrode portions 3a, 3b, and 3c of the pixel electrode 3, the electrode portion 3a at one end of the pixel electrode 3 to which the TFT 6 is connected and the central electrode portion 3b adjoining electrode portion 3a are connected with each other is formed at an end of the shorter side that is opposite to one end of the shorter side at which the TFT 6 is connected, whereas the connecting portion 52 at which the central electrode portion 3b and the electrode portion 3c at the other end of the pixel electrode 3 are connected with each other is formed at the end corresponding to the end at which the TFT 6 is connected. According to the present embodiment, since the connecting portions 52 are formed at opposite longer sides of the pixel electrode 3 alternately, the mutual influence among the liquid crystal molecules 21a in the respective sub-pixels corresponding to the plurality of electrode portions 3a, 3b, and 3c of the pixel electrode 3 due to the alignments in the respective sub-pixel can be minimized, allowing the liquid crystal molecules 21a to be aligned into a lying alignment more stably than the second embodiment, from the periphery of the sub-pixel toward the center of the sub-pixel, sub-pixel by sub-pixel in each pixel.

Fourth Embodiment

Figure 8:
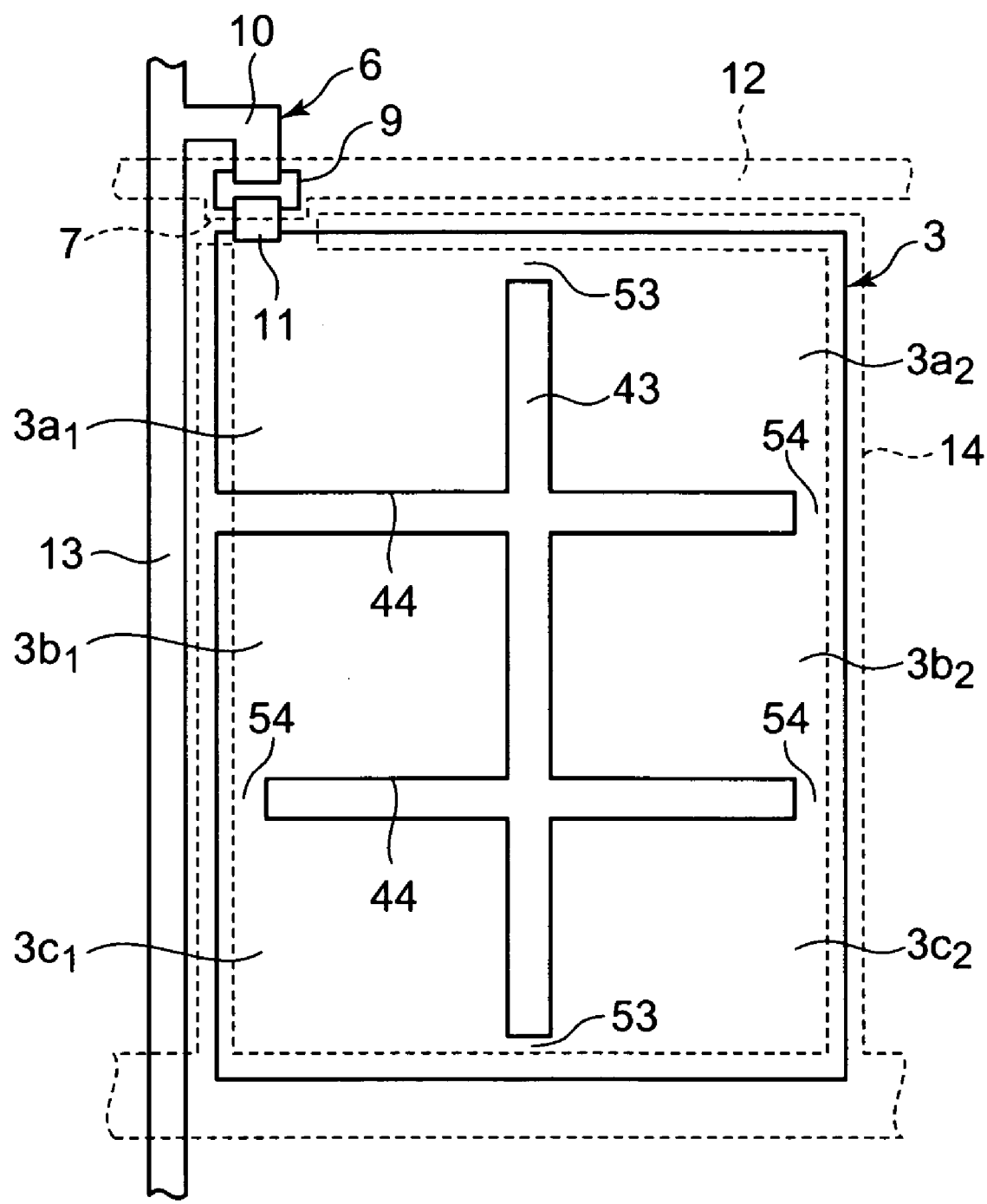
FIG. 8 is a plan view of one pixel on one substrate of a liquid crystal display device as the fourth embodiment of the present invention.

FIG. 8 is a plan view of one pixel on one substrate of a liquid crystal display device as the fourth embodiment of the present invention. In the present embodiment, the components same as those in the first and second embodiments will be given the same reference numerals, and explanation for such components will be omitted.

The liquid crystal display device according to the present embodiment is structured as follows: each of the plurality of pixel electrodes 3 is formed in a shape of substantially a rectangle; the source electrode 11 of the TFT 6 is connected at one side of one edge of the pixel electrode 3 as seen lengthwise; the pixel electrode 3 is provided with a plurality of slits 43 and 44 that separate the pixel electrode 3 into a plurality of electrode portions $3a_1$, $3a_2$, $3b_1$, $3b_2$, $3c_1$, and $3c_2$ that are arranged side by side along the lengthwise direction and the widthwise direction respectively, in two columns in the widthwise direction and in at least two rows, for example, three rows per column in the lengthwise direction; and connecting portions 53 and 54 at which adjoining electrode portions among these electrode portions $3a_1$, $3a_2$, $3b_1$, $3b_2$, $3c_1$, and $3c_2$ are connected with each other are formed for each electrode portion at at least one of the locations between each electrode portion and its adjoining electrode portion in the same column and between each electrode portion and its adjoining electrode portion in the same row, at a position that is 20 off the center of widths of each of the electrode portions $3a_1$, $3a_2$, $3b_1$, $3b_2$, $3c_1$, and $3c_2$ in the directions parallel with the slits 43 and 44 respectively, toward one side of the widths of each electrode portion. The structure of the liquid crystal display device of the present embodiment is the same as that of the liquid crystal display device of the first embodiment in the other respects.

According to the present embodiment, one lengthwise slit 43 is formed at the center of the width (shorter side) of the pixel electrode 3, and widthwise slits 44 are formed at two positions at which the length (longer side) of the pixel electrode 3 is substantially trisected. The connecting portions 53 are formed at both ends of the lengthwise slit 43. Of the widthwise slits 44 at the two positions, the widthwise slit 44 closer to the TFT 6 has its one end that is closer to the TFT 6 reach the edge of the pixel electrode 3, and has its other end farther from the TFT 6 provided with the connecting portion 54. The other widthwise slit 44 farther from the TFT 6 has its both ends provided with the connecting portions 54. With this structure, all the electrode portions $3a_1$, $3a_2$, $3b_1$, $3b_2$, $3c_1$, and $3c_2$ are arranged in two columns and three rows are connected with each other sequentially at the connecting portions 53 and 54.

Since the present liquid crystal display device has the connecting portions 53 and 54 at which adjoining electrode portions among the electrode portions $3a_1$, $3a_2$, $3b_1$, $3b_2$, $3c_1$, and $3c_2$ are connected with each other formed for each electrode portion between each electrode portion and at least one of its adjoining electrode portion in the same column and its adjoining electrode portion in the same row, at a position that is off the center of widths of each of the electrode portions $3a_1$, $3a_2$, $3b_1$, $3b_2$, $3c_1$, and $3c_2$ in the directions parallel with the slits 43 and 44 respectively toward one side of the widths of each electrode portion, the liquid crystal molecules 21a in each pixel can be aligned, when a voltage is applied, stably into a lying alignment, sub-pixel by sub-pixel corresponding to the plurality of electrode portions $3a_1$, $3a_2$, $3b_1$, $3b_2$, $3c_1$, and $3c_2$ of the pixel electrode, from the periphery of the sub-pixel toward the center of the sub-pixel, enabling a high-quality image with no display roughness to be displayed, likewise in the liquid crystal display device according to the second and third embodiments.

Further, since the present liquid crystal display device has at least the connecting portion 53 at which, of the plurality of electrode portions $3a_1$, $3a_2$, $3b_1$, $3b_2$, $3c_1$, and $3c_2$, the electrode portion $3a_1$ to which the TFT 6 is connected and its adjoining electrode portion (according to the present embodiment, the electrode portion adjoining the electrode portion $3a_1$ in the direction of row) $3a_2$ are connected with each other formed at a position that is off the extension line that runs from a lateral field generated between the gate electrode 7 of the TFT 6 and an edge of the electrode portion $3a_1$ to which the TFT 6 is connected (according to the present embodiment, such a position being on the shorter side of the pixel electrode 3), the disorder in the alignment of the liquid crystal molecules 21a caused by a lateral field generated between the gate electrode 7 of the TFT 6 and the electrode portion $3a_1$ to which the TFT 6 is connected in the sub-pixel corresponding to the electrode portion $3a_1$ is hindered from influencing the alignment of the liquid crystal molecules 21a in the adjoining electrode portion $3a_2$, making it possible to obtain a stable state of alignment in each pixel.

According to the present embodiment, the connecting portions 53 and 54 of the plurality of electrode portions $3a_1$, $3a_2$, $3b_1$, $3b_2$, $3c_1$, and $3c_2$ of the pixel electrode 3 are formed at the positions shown in FIG. 8. However, the positions and number of the connecting portions 53 and 54 may be other ones respectively, as long as all the electrode portions $3a_1$, $3a_2$, $3b_1$, $3b_2$, $3c_1$, and $3c_2$ can be connected.

In the liquid crystal display device according to the present embodiment, it is 15 preferred that each of the plurality of electrode portions $3a_1$, $3a_2$, $3b_1$, $3b_2$, $3c_1$, and $3c_2$ of the pixel electrode 3 be formed substantially in a shape of a square. With this shape, the liquid crystal molecules 21a in the sub-pixel respectively corresponding to the plurality of electrode portions $3a_1$, $3a_2$, $3b_1$, $3b_2$, $3c_1$ and $3c_2$ of the pixel electrode 3 can be aligned into a lying alignment with a fine balance, sub-pixel by sub-pixel, from the periphery of the sub-pixel toward the center of the sub-pixel.

Further, in the liquid crystal display device according to the present embodiment, it is preferred that the width $W_1$ as the width of the electrode portions $3a_1$, $3a_2$, $3b_1$, $3b_2$, $3c_1$, and $3c_2$ in the direction parallel with the slits 43 and 44 and the width $W_2$ as the width of the connecting portions 53 and 54 be set to values that satisfy $W_2/W_1 \leq 0.13$, likewise the above-described first embodiment. With such values, the liquid crystal molecules 21a in each pixel can be more stably aligned into a lying alignment, sub-pixel by sub-pixel corresponding to the plurality of electrode portions $3a_1$, $3a_2$, $3b_1$, $3b_2$, $3c_1$, and $3c_2$ of the pixel electrode 3, from the periphery of the sub-pixel toward the center of the sub-pixel, when a writing voltage is applied.

Furthermore, it is preferred that the width of the slits 43 and 44 of the pixel electrode 3 should be 4.0 μm or smaller. With this width, a sufficient aperture ratio can be obtained.

Fifth Embodiment

Figure 9:
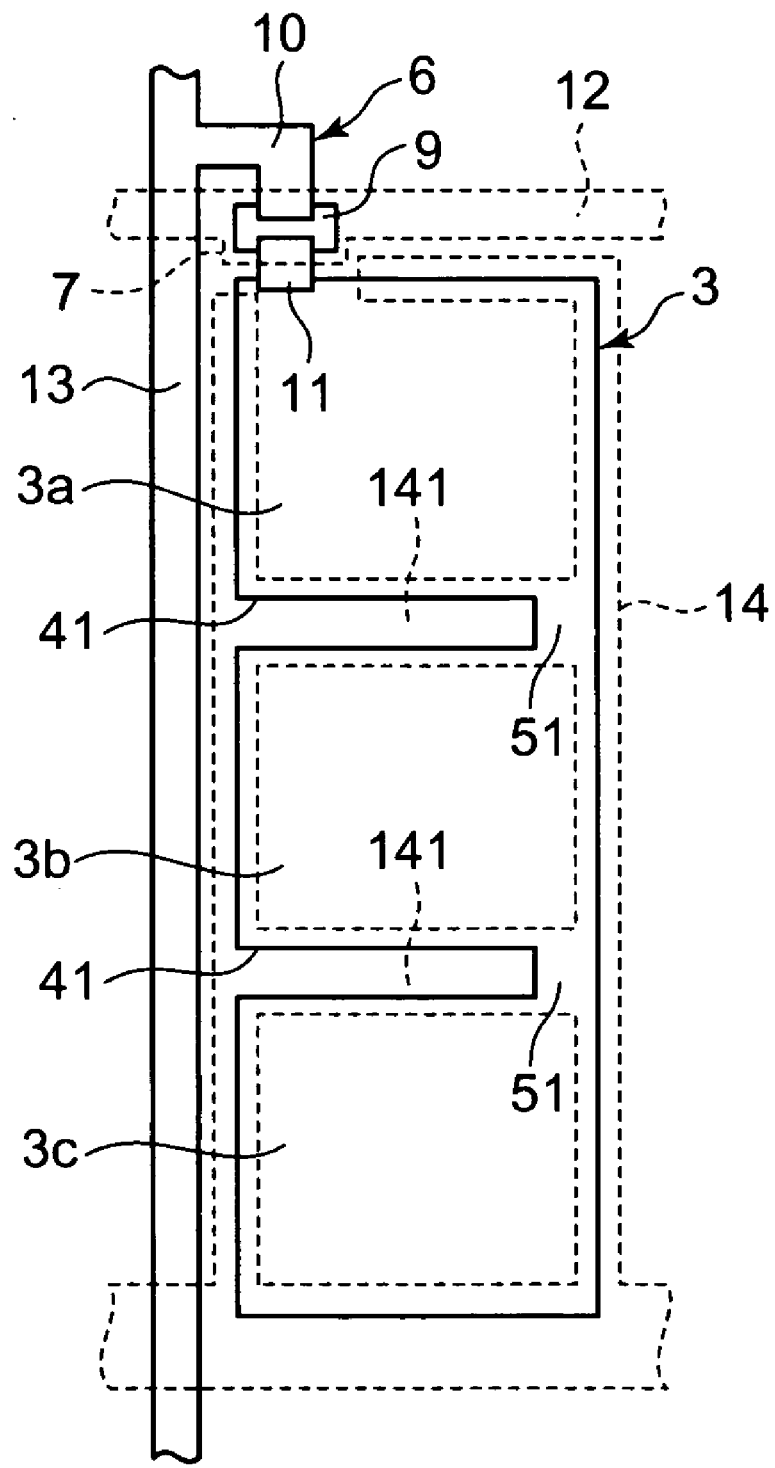
FIG. 9 is a plan view of one pixel on one substrate of a liquid crystal display device as the fifth embodiment of the present invention.

FIG. 9 is a plan view of a pixel on one substrate of a liquid crystal display device as the fifth embodiment of the present invention. The present liquid crystal display device corresponds to the liquid crystal display device according to the second embodiment shown in FIG. 5 as modified by providing an auxiliary electrode 141 which is formed between the surface of the rear substrate 1 on which the plurality of pixel electrodes 3 are provided and a plane on which the pixel electrodes 3 are formed so as to positionally correspond to the slits 41 of each of the plurality of pixel electrodes 3 for forming a substantially zero electric field region between itself and the opposing electrode 17 on the front substrate 2. The auxiliary electrode 141 is supplied with a predetermined electric potential, and is set to the same electric potential as the opposing electrode 17. According to the present embodiment, the auxiliary electrode 141 is formed integrally with the compensating-capacitor electrode 14 which forms a compensating capacity between itself and the edge of each of the plurality of pixel electrodes 3.

In the present embodiment, the components same as those in the first and second embodiments will be given the same reference numerals, and explanation for such components will be omitted.

The liquid crystal display device according to the present embodiment may be the liquid crystal display device according to the first embodiment shown in FIG. 1 to FIG. 3, the liquid crystal display device according to the third embodiment shown in FIG. 7, or the liquid crystal display device according to the fourth embodiment shown in FIG. 8 as modified by providing the auxiliary electrode 141.

The present liquid crystal display device is provided with the auxiliary electrode 141 between the surface of the rear substrate 1 on which the plurality of pixel electrodes 3 are provided and the plane on which these pixel electrodes 3 are formed so as to correspond to the slits 41 of each of the plurality of pixel electrodes 3, for forming a substantially no electric field region between itself and the opposing electrode 17 on the front substrate 2. Because of this, the liquid crystal molecules 21a existing in the portions corresponding to the slits 41 of the pixel electrode 3, that is, the portions between the electrode portions 3a and 3b and between the electrode portions 3b and 3c adjoining each other with the slit 41 therebetween, can be aligned substantially perpendicularly to the substrates 1 and 2, and the liquid crystal molecules 21a in each pixel can be aligned more stably into a lying alignment, sub-pixel by sub-pixel corresponding to the plurality of electrode portions 3a, 3b, and 3c of the pixel electrode 3, from the periphery of the sub-pixel toward the center of the sub-pixel, when a voltage is applied.

Further, according to the present embodiment, since the auxiliary electrode 141 is formed integrally with the compensating-capacitor electrode 14, the liquid crystal display device can be manufactured more easily than in a case where the compensating-capacitor electrode 14 and the auxiliary electrode 141 are formed by using different metal films.

Sixth Embodiment

Figure 10:
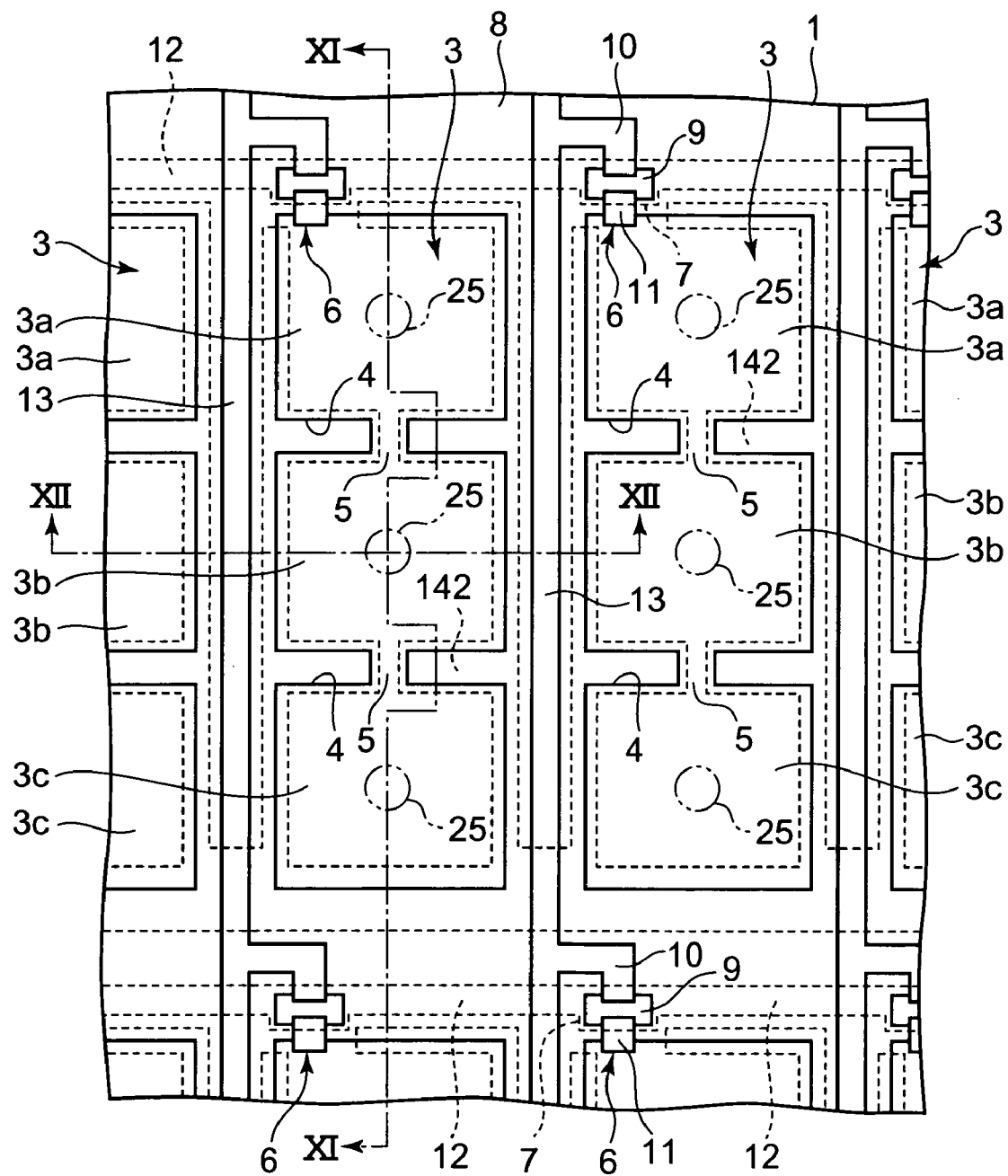
FIG. 10 is a plan view of one part of on substrate of a liquid crystal display device as the sixth embodiment of the present invention.
Figure 11:
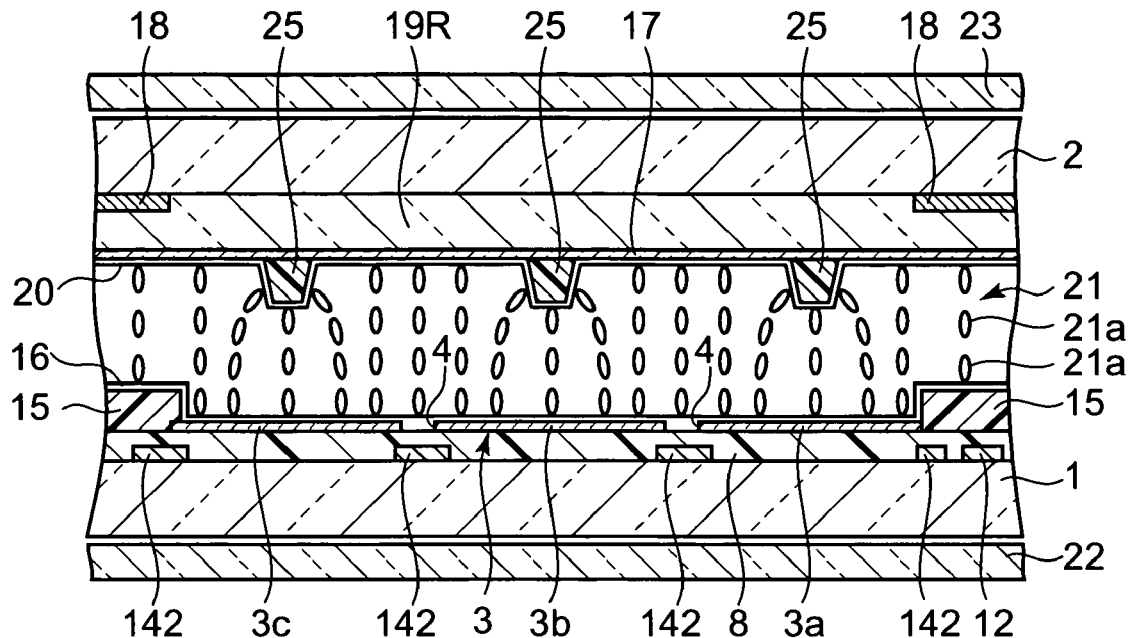
FIG. 11 is a cross sectional view of the liquid crystal display device of FIG. 10 as cut along the line XI-XI.
Figure 12:
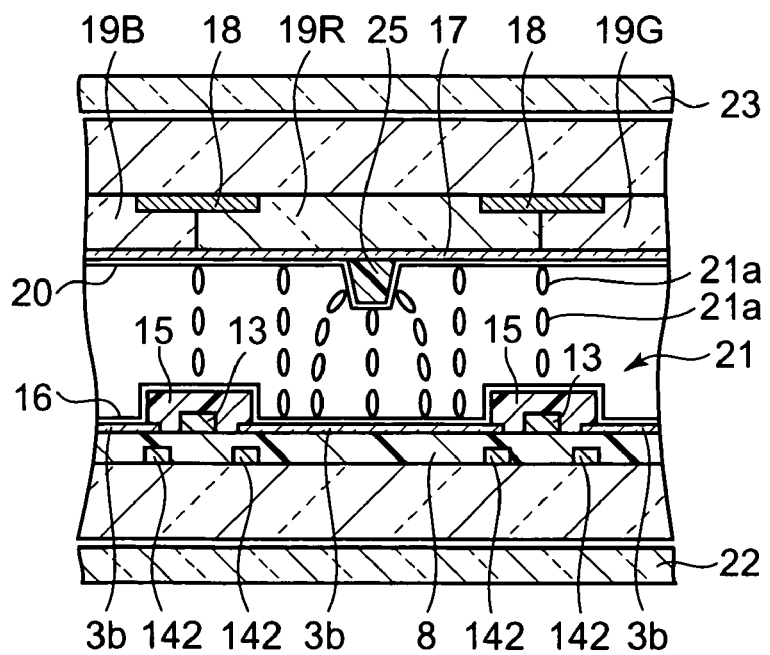
FIG. 12 is a cross sectional view of the liquid crystal display device of FIG. 10 as cut along the line XII-XII.

FIG. 10 to FIG. 14 show the sixth embodiment of the present invention, where FIG. 10 is a plan view of a part of one substrate of a liquid crystal display device, FIG. 11 is a cross sectional view of the liquid crystal display device of FIG. 10 as cut along the line XI-XI, and FIG. 12 is a cross sectional view of the liquid crystal display device of FIG. 10 as cut along the line XII-XII.

The present liquid crystal display device corresponds to the liquid crystal display device according to the first embodiment shown in FIG. 1 as modified by providing an auxiliary electrode 142 which is formed between the surface of the rear substrate 1 on which the plurality of pixel electrodes 3 are provided and a plane on which these pixel electrodes 3 are formed so as to positionally correspond to the slits 41 of each of the plurality of pixel electrodes 3 for forming a substantially zero electric field region between itself and the opposing electrode 17 on the front substrate 2, and as modified further by forming protrusions on the inner surface of the front substrate 2 at positions corresponding to the center of the respective electrode portions. The auxiliary electrode 142 is supplied with a predetermined electric potential, and is set to the same electric potential as the opposing electrode 17 according to the present embodiment. The auxiliary electrode 142 is formed integrally with the compensating-capacitor electrode 14 which forms a compensating capacity between itself and the edge of each of the plurality of pixel electrodes 3.

In the present embodiment, the components same as those in the first embodiment will be given the same reference numerals, and explanation for such components will be omitted.

According to the present embodiment, the auxiliary electrode 142 is provided on the inner surface of the rear substrate 1 between the surface of the rear substrate 1 and the plane on which the plurality of pixel electrodes 3 are formed, so as to correspond to the edges of the plurality of pixel electrodes 3 and the slits 4 while insulated from the pixel electrodes 3, and so as to be opposite to the opposing electrode 17 on the front substrate 2 for forming an electric field having a predetermined value between itself and the opposing electrode 17. The auxiliary electrode 142 is formed along all the edges of each of the electrode portions 3a, 3b, and 3c which are separated by the slits 4 of the pixel electrode 3, and serves also as the compensating-capacitor electrode for forming a compensating capacity between itself and the pixel electrode 3.

That is, the auxiliary electrode 142 is formed of a metal film which is provided on the surface of the rear substrate 1 so as to correspond to the circumference of the pixel electrode 3 except the TFT connection portion thereof and to the slits 4, wherein the portion corresponding to the circumference of the pixel electrode 3 has a frame-like shape whose inner edges face the circumference of the pixel electrode 3 so as to partially overlap with the circumference and whose outer edges are defined away from the pixel electrode 3, and the portions corresponding to the slits 4 each have such a width as to make its both edges face the edges of the electrode portions 3a, 3b, and 3c of the pixel electrode 3. The portion of this metal film that faces the pixel electrode 3 forms a compensating capacitor with the gate insulation film 8 serving as a dielectric layer, and the portion of the metal film that is spread away from the pixel electrode 3 and the portions corresponding to the interior of the slits 4 form a region between themselves and the opposing electrode 17 in which region an electric field having the predetermined value is generated.

Furthermore, a plurality of protrusions 25 made of a dielectric material are formed on the inner surface of the front substrate 2 at positions corresponding to the center of the respective electrode portions 3a, 3b, and 3c which are separated by the slits 4 of each of the plurality of pixel electrodes 3 on the rear substrate 1.

The plurality of protrusions 25 is formed by using a dielectric material such as a photosensitive resin, on the opposing electrode 17, so as to have a shape of a truncated cone having its diameter decreasing toward its top. The vertical alignment film 20 is formed so as to cover these protrusions 25 and the opposing electrode 17.

Since the present liquid crystal display device is provided with the plurality of protrusions 25 which are formed on the inner surface of the front substrate 2 on which the opposing electrode 17 is formed, correspondingly to the center of the respective electrode portions 3a, 3b, and 3c which are separated by the slits 4 of each of the plurality of pixel electrodes 3 on the rear substrate 1, the liquid crystal molecules 21a in each pixel can be aligned stably into a lying alignment sub-pixel by sub-pixel corresponding to the electrode portions 3a, 3b, and 3c, from the periphery of the sub-pixel toward the center of the sub-pixel.

Figure 13:
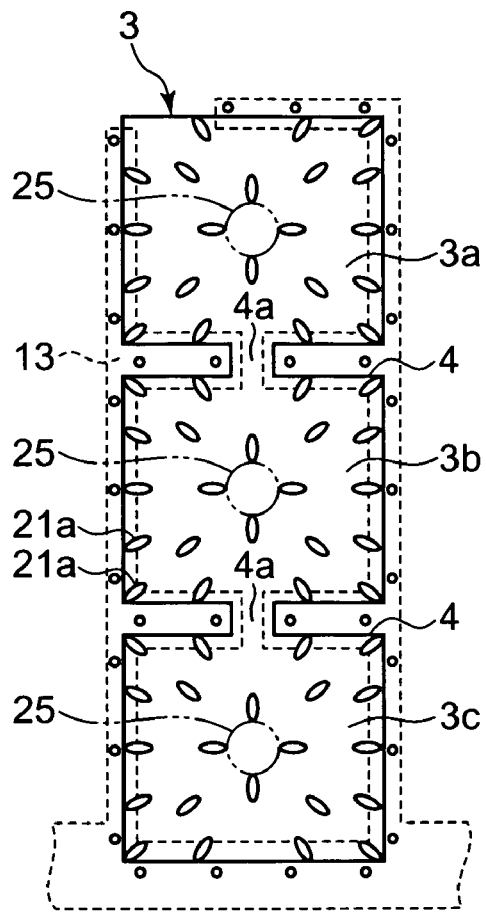
FIG. 13 is a plan view exemplarily showing a state of alignment of liquid crystal molecules in one pixel of the liquid crystal display device according to the sixth embodiment, when a voltage is applied.
Figure 14:
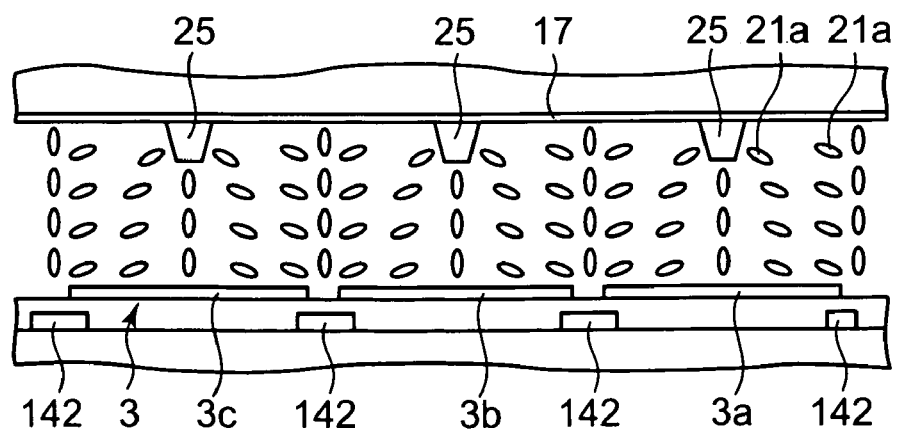
FIG. 14 is a cross sectional view exemplarily showing a state of alignment of liquid crystal molecules in one pixel of the liquid crystal display device according to the sixth embodiment, when a voltage is applied.

FIG. 13 and FIG. 14 are a plan view and a cross sectional view each exemplarily showing the state of alignment of the liquid crystal molecules 21a in one pixel of the liquid crystal display device when a voltage is applied. The present liquid crystal display device has the liquid crystal molecules 21a in each sub-pixel corresponding to each of the electrode portions 3a, 3b, and 3c of the pixel electrode 3 induced by the molecule alignment near the protrusion 25 to lie down toward the protrusion 25, i.e., toward the center of each sub-pixel as shown in FIG. 13 and FIG. 14 when a voltage is applied between the pixel electrode 3 and the opposing electrode 17, thereby enabling a much higher-quality image to be displayed.

In addition, since the present liquid crystal display device is provided with the auxiliary electrode 142 which corresponds to the slits 4 of each of the plurality of pixel electrodes 3 so as to face the opposing electrode 17 on the front substrate 2 to generate an electric field having a predetermined value between itself and the opposing electrode 17, even if the width of the slits 4 is small, the liquid crystal molecules 21a in each sub-pixel corresponding to each of the electrode portions 3a, 3b, and 3c of the pixel electrode 3 can be stably aligned into a lying alignment when a voltage is applied.

Furthermore, since the present liquid crystal display device has the auxiliary electrode 142 formed along all the edges of each of the electrode portions 3a, 3b, and 3c which are separated by the slits 4 of the pixel electrode 3, the liquid crystal molecules 21a can be more stably aligned into a lying alignment, sub-pixel by sub-pixel corresponding to the electrode portions 3a, 3b, and 3c of the pixel electrode.

Yet further, since the present liquid crystal display device has the auxiliary electrode 142 set to substantially the same electric potential as the opposing electrode 17, the auxiliary electrode 142 and the opposing electrode 17 can have a substantially zero electric field state therebetween to allow the liquid crystal molecules 142 existing therebetween to be aligned substantially vertically as shown in FIG. 13 and FIG. 14, thereby enabling the liquid crystal molecules 21a in each pixel to be much more stably aligned into a lying alignment sub-pixel by sub-pixel.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-375018 filed on Dec. 24, 2004 and Japanese Patent Application No. 2004-377374 filed on Dec. 27, 2004 and including specification, claims, drawings and summary. The disclosures of the above Japanese Patent Applications are incorporated herein by reference in their entities.

What is claimed is:

1. A liquid crystal display device comprising:
a first substrate;
a second substrate provided so as to oppose the first substrate; and
a liquid crystal layer containing liquid crystals having a negative dielectric anisotropy, the liquid crystal layer being provided between the first substrate and the second substrate;
wherein the liquid crystal display device further comprises, on a surface of the first substrate facing the liquid crystal layer:
a gate line provided so as to run in a predetermined direction;
a data line provided so as to intersect the gate line;
a TFT corresponding to an intersection between the gate line and the data line, wherein a drain electrode of the TFT is connected to the data line, and a gate electrode of the TFT is connected to the gate line; and
a pixel electrode connected to a source electrode of the TFT;
wherein the pixel electrode comprises: (i) a plurality of electrode portions, which are formed with a second conductive film, arranged in one line along a data line direction, and (ii) connecting portions electrically connecting the electrode Portions;
wherein the source electrode of the TFT is electrically connected to the pixel electrode at a position of the pixel electrode closer, along the predetermined direction, to a first side of the pixel electrode, wherein the first side of the pixel electrode is near and runs along the data line;
wherein the electrode portions are electrically connected to each other by the connecting portions at positions of the pixel electrode closer, along the predetermined direction, to a second side of the pixel electrode, wherein the second side of the pixel electrode opposes the first side of the pixel electrode; and
wherein slits are provided in the pixel electrode to completely separate sides of the electrode portions at the first side of the pixel electrode;
wherein the liquid crystal display device further comprises an opposing electrode, which is formed with a first conductive film, formed on a surface of the second substrate facing the liquid crystal layer;
wherein when a voltage is applied between the pixel electrode and the opposing electrode, the liquid crystal molecules of the liquid crystal layer are aligned radially so that a center of radial alignment is positioned at each of the electrode portions, which are arranged in one line along the data line direction, in an area where the first and second conductive films are formed; and
wherein the connecting portions electrically connect the electrode portions so that the electrode portions are not separated from each other anywhere between the connecting portions and the second side of the pixel electrode along the predetermined direction.

2. The liquid crystal display device according to claim 1, wherein the source electrode of the TFT is electrically connected to the pixel electrode at a first one of the electrode portions, which is positioned closest to the gate line among the plurality of electrode portions.

3. The liquid crystal display device according to claim 1, wherein the source electrode of the TFT is connected to the pixel electrode along the data line direction, at a side of the pixel electrode at which the gate line is provided.

4. The liquid crystal display device according to claim 1, wherein one said connecting portion is provided between each two adjacent ones of the electrode portions.

5. The liquid crystal display device according to claim 4, wherein the electrode portions and the connecting portions constitute one layer and are formed of one material.

6. The liquid crystal display device according to claim 1, wherein $W_2/W_1 \leq 0.13$, where a width of each of the electrode portions in the predetermined direction is $W_1$, and a width of each of the connecting portions in the predetermined direction is $W_2$.

7. The liquid crystal display device according to claim 1, wherein the pixel electrode comprises three electrode portions.

8. The liquid crystal display device according to claim 1, wherein when a voltage is not applied between the pixel electrode and the opposing electrode, liquid crystal molecules of the liquid crystal layer are aligned perpendicularly to surfaces of the substrates.

9. The liquid crystal display device according to claim 1, wherein the first substrate is formed with a compensating-capacitor electrode positioned to correspond to sides of the electrode portions, and a potential of the compensating-capacitor electrode is set to be equal to a potential of the opposing electrode.

10. The liquid crystal display device according to claim 1, wherein the slits are longer in the predetermined direction than in the data line direction.

11. The liquid crystal display device according to claim 1, wherein the electrode portions are formed so as not to overlap the data line or the gate line.

12. The liquid crystal display device according to claim 1, wherein the pixel electrode is formed such that the electrode portions thereof do not overlap a data line to which another adjacent pixel electrode is connected.

13. The liquid crystal display device according to claim 1, wherein the pixel electrode is formed such that the electrode portions thereof do not overlap a gate line to which another adjacent pixel electrode is connected.

14. The liquid crystal display device according to claim 1, wherein the slits extend in parallel with each other.

15. The liquid crystal display device according to claim 3, wherein a direction along which the drain electrode, the gate electrode, and the source electrode of the TFT are arranged is parallel with the direction along which the electrode portions are arranged.

16. A liquid crystal display device comprising:
a first substrate;
a second substrate provided so as to oppose the first substrate; and
a liquid crystal layer containing liquid crystals having a negative dielectric anisotropy, the liquid crystal layer being provided between the first substrate and the second substrate;
wherein the liquid crystal display device further comprises, on a surface of the first substrate facing the liquid crystal layer:
a gate line provided so as to run in a predetermined direction;
a data line provided so as to intersect the gate line;

a TFT corresponding to an intersection between the gate line and the data line, wherein a drain electrode of the TFT is connected to the data line, and a gate electrode of the TFT is connected to the gate line; and a pixel electrode connected to a source electrode of the TFT;

wherein the pixel electrode comprises: (i) a plurality of electrode portions, which are formed with a second conductive film, arranged in one line along a data line direction, and (ii) connecting portions electrically connecting the electrode portions;

wherein the source electrode of the TFT is electrically connected to the pixel electrode at a position of the pixel electrode closer, along the predetermined direction, to a first side of the pixel electrode, wherein the first side of the pixel electrode is near and runs along the data line;

wherein the electrode portions are electrically connected to each other by the connecting portions at positions of the pixel electrode closer, along the predetermined direction, to a second side of the pixel electrode, wherein the second side of the pixel electrode opposes the first side of the pixel electrode; and wherein slits are provided in the pixel electrode to completely separate sides of the electrode portions at the first side of the pixel electrode;

wherein the liquid crystal display device further comprises an opposing electrode, which is formed with a first conductive film, formed on a surface of the second substrate facing the liquid crystal layer;

wherein when a voltage is applied between the pixel electrode and the opposing electrode, the liquid crystal molecules of the liquid crystal layer are aligned radially so that a center of radial alignment is positioned at each of the electrode portions, which are arranged in one line along the data line direction, in an area where the first and second conductive films are formed;

wherein the source electrode of the TFT is electrically connected to the pixel electrode at a first one of the electrode Portions, which is positioned closest to the gate line among the plurality of electrode portions; and wherein the first electrode portion is connected to a second one of the electrode portions, which is adjacent to the first electrode portion, at a position of the first electrode portion farthest from the TFT.

17. A liquid crystal display device comprising:

a first substrate;

a second substrate provided so as to oppose the first substrate; and a liquid crystal layer containing liquid crystals having a negative dielectric anisotropy, the liquid crystal layer being provided between the first substrate and the second substrate;

wherein the liquid crystal display device further comprises, on a surface of the first substrate facing the liquid crystal layer:

a gate line provided so as to run in a predetermined direction;

a data line provided so as to intersect the gate line;

a TFT corresponding to an intersection between the gate line and the data line, wherein a drain electrode of the TFT is connected to the data line, and a gate electrode of the TFT is connected to the gate line; and a pixel electrode connected to a source electrode of the TFT;

wherein the pixel electrode comprises: (i) a plurality of electrode portions, which are formed with a second conductive film, arranged in one line along a data line direction, and (ii) connecting portions electrically connecting the electrode portions;

wherein the source electrode of the TFT is electrically connected to the pixel electrode at a position of the pixel electrode closer, along the predetermined direction, to a first side of the pixel electrode, wherein the first side of the pixel electrode is near and runs along the data line;

wherein the electrode portions are electrically connected to each other by the connecting portions at positions of the pixel electrode closer, along the predetermined direction, to a second side of the pixel electrode, wherein the second side of the pixel electrode opposes the first side of the pixel electrode; and wherein slits are provided in the pixel electrode to completely separate sides of the electrode portions at the first side of the pixel electrode;

wherein the liquid crystal display device further comprises an opposing electrode, which is formed with a first conductive film, formed on a surface of the second substrate facing the liquid crystal layer;

wherein when a voltage is applied between the pixel electrode and the opposing electrode, the liquid crystal molecules of the liquid crystal layer are aligned radially so that a center of radial alignment is positioned at each of the electrode portions, which are arranged in one line along the data line direction, in an area where the first and second conductive films are formed; and wherein each of the electrode portions has a rectangular shape with a same area.

18. A liquid crystal display device comprising:

a first substrate;

a second substrate provided so as to oppose the first substrate; and a liquid crystal layer containing liquid crystals having a negative dielectric anisotropy, the liquid crystal layer being provided between the first substrate and the second substrate;

wherein the liquid crystal display device further comprises, on a surface of the first substrate facing the liquid crystal layer:

a gate line provided so as to run in a predetermined direction;

a data line provided so as to intersect the gate line;

a TFT corresponding to an intersection between the gate line and the data line, wherein a drain electrode of the TFT is connected to the data line, and a gate electrode of the TFT is connected to the gate line; and a pixel electrode connected to a source electrode of the TFT;

wherein the pixel electrode comprises: (i) a plurality of electrode portions, which are formed with a second conductive film, arranged in one line along a data line direction, and (ii) connecting portions electrically connecting the electrode Portions;

wherein the source electrode of the TFT is electrically connected to the pixel electrode at a position of the pixel electrode closer, along the predetermined direction, to a first side of the pixel electrode, wherein the first side of the pixel electrode is near and runs along the data line;

wherein the electrode portions are electrically connected to each other by the connecting portions at positions of the pixel electrode closer, along the predetermined direction, to a second side of the pixel electrode, wherein the second side of the pixel electrode opposes the first side of the pixel electrode; and wherein slits are provided in the pixel electrode to completely separate sides of the electrode portions at the first side of the pixel electrode;

wherein the liquid crystal display device further comprises an opposing electrode, which is formed with a first conductive film, formed on a surface of the second substrate facing the liquid crystal layer;

wherein when a voltage is applied between the pixel electrode and the opposing electrode, the liquid crystal molecules of the liquid crystal layer are aligned radially so that a center of radial alignment is positioned at each of the electrode portions, which are arranged in one line along the data line direction, in an area where the first and second conductive films are formed; and wherein the pixel electrode has a straight side formed by one side of each of the electrode portions and one side of each of the connecting portions.

19. A liquid crystal display device comprising:

a first substrate;

a second substrate provided so as to oppose the first substrate; and a liquid crystal layer containing liquid crystals having a negative dielectric anisotropy, the liquid crystal layer being provided between the first substrate and the second substrate;

wherein the liquid crystal display device further comprises, on a surface of the first substrate facing the liquid crystal layer:

a gate line provided so as to run in a predetermined direction;

a data line provided so as to intersect the gate line;

a TFT corresponding to an intersection between the gate line and the data line, wherein a drain electrode of the TFT is connected to the data line, and a gate electrode of the TFT is connected to the gate line; and a pixel electrode connected to a source electrode of the TFT;

wherein the pixel electrode comprises: (i) a plurality of electrode portions, which are formed with a second conductive film, arranged in one line along a data line direction, and (ii) connecting portions electrically connecting the electrode portions;

wherein the source electrode of the TFT is electrically connected to the pixel electrode at a position of the pixel electrode closer, along the predetermined direction, to a first side of the pixel electrode, wherein the first side of the pixel electrode is near and runs along the data line;

wherein the electrode portions are electrically connected to each other by the connecting portions at positions of the pixel electrode closer, along the predetermined direction, to a second side of the pixel electrode, wherein the second side of the pixel electrode opposes the first side of the pixel electrode; and wherein slits are provided in the pixel electrode to completely separate sides of the electrode portions at the first side of the pixel electrode;

wherein the liquid crystal display device further comprises an opposing electrode, which is formed with a first conductive film, formed on a surface of the second substrate facing the liquid crystal layer;

wherein when a voltage is applied between the pixel electrode and the opposing electrode, the liquid crystal molecules of the liquid crystal layer are aligned radially so that a center of radial alignment is positioned at each of the electrode portions, which are arranged in one line along the data line direction, in an area where the first and second conductive films are formed; and wherein the connecting portions are arranged such that sides of the electrode portions at the second side of the pixel electrode are connected with each other such that the second side of the pixel electrode is straight.

* * * * *